United States Patent
Mullins et al.

(10) Patent No.: US 10,467,298 B2
(45) Date of Patent: Nov. 5, 2019

(54) DOCUMENT COLLABORATION DISCOVERY

(71) Applicant: Microsoft Technology Licensing, LLC, Redmond, WA (US)

(72) Inventors: Christopher Lee Mullins, Sammamish, WA (US); Robert Standefer, Duvall, WA (US); Miguel Castro, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 15/138,024

(22) Filed: Apr. 25, 2016

(65) Prior Publication Data

US 2017/0308610 A1    Oct. 26, 2017

(51) Int. Cl.
G06F 17/30 (2006.01)
G06F 7/00 (2006.01)
G06F 16/951 (2019.01)
G06F 16/93 (2019.01)
G06F 16/958 (2019.01)
(Continued)

(52) U.S. Cl.
CPC ........ G06F 16/951 (2019.01); G06F 16/2228 (2019.01); G06F 16/316 (2019.01); G06F 16/38 (2019.01); G06F 16/93 (2019.01); G06F 16/958 (2019.01); G06F 17/2288 (2013.01); G06F 17/24 (2013.01); H04L 51/04 (2013.01)

(58) Field of Classification Search
CPC ........ G06F 17/30864; G06F 17/30321; G06F 17/30619; G06F 17/30011; G06F 17/24; G06F 17/3089

USPC ........................................................ 707/706
See application file for complete search history.

(56) References Cited

U.S. PATENT DOCUMENTS

| | | | |
|---|---|---|---|
| 9,483,473 B2 * | 11/2016 | Ansel | G06F 17/30011 |
| 2011/0252093 A1 * | 10/2011 | Spataro | G06Q 10/10 |
| | | | 709/204 |
| 2013/0024418 A1 * | 1/2013 | Sitrick | G06Q 10/101 |
| | | | 707/608 |

FOREIGN PATENT DOCUMENTS

WO    2013181198 A2    12/2013

OTHER PUBLICATIONS

"Controlling Google Docs Editing Permissions", Retrieved from «https://web.archive.org/web/20160403103247/https://it.stonybrook.edu/help/kb/controlling-google-docs-editing-permissions», Apr. 3, 2016, 3 Pages.

(Continued)

Primary Examiner — Kuen S Lu

(74) Attorney, Agent, or Firm — Michael Best & Friedrich LLP

(57) ABSTRACT

Technologies are described herein for document collaboration discovery. A collaboration system enables users to collaboratively author documents. The collaboration system receives edits to a document in real or near real time, and indexes the edits in a search index. The collaboration system can also receive and index metadata associated with the document. The collaboration system can also receive a search query from a user and perform a search of the search index. If the document is identified by the search, the user can request to be admitted as an active editor of the document. The user can also request to join a real-time messaging session with other active editors of the document. The active editors can be notified of the search terms that led (Continued)

the user to the document, and indicate whether the user is to be admitted to the document as an active editor or the real-time messaging session.

20 Claims, 12 Drawing Sheets

(51) Int. Cl.
| | | |
|---|---|---|
| G06F 16/22 | (2019.01) | |
| G06F 17/24 | (2006.01) | |
| G06F 17/22 | (2006.01) | |
| G06F 16/31 | (2019.01) | |
| G06F 16/38 | (2019.01) | |
| H04L 12/58 | (2006.01) | |

(56) References Cited

OTHER PUBLICATIONS

"Introduction to Google Docs", Retrieved from «https://web.archiveorg/web/20150912105459/www.lfpl.org/jobshop/docs/google-docs.pdf», Sep. 12, 2015, 21 Pages. .

Byrne, Richard, "How to Search for Publicly Shared Google Docs, Slides, and Spreadsheets", Retrieved from «http://www.freetech4teachers.com/2015/02/how-to-search-for-publicly-shared.html#.WSVxGHpMek4», Feb. 17, 2015, 3 Pages.

Herrick, Dan R., "Google This!:Using Google Apps for Collaboration and Productivity", In Proceedings of the 37th Annual ACM Special Interest Group on University and College Computing Services Fall Conference: Communication and Collaboration, Oct. 11, 2009, pp. 55-64.

"International Search Report and Written Opinion Issued in PCT Application No. PCT/US2017/028598", dated Jun. 14, 2017, 15 Pages.

Sun, et al., "Collaboration in the Cloud at Google", Retrieved from «https://research.google.com/pubs/archive/41926.pdf», Jan. 8, 2014, 13 Pages.

* cited by examiner

DOCUMENT COLLABORATION DISCOVERY

BACKGROUND

Various technologies currently exist for allowing computer users to create electronic documents, to search for electronic documents, and to communicate with other users regarding electronic documents. These activities, however, are typically manually performed and completely separate from one another. Take, for example, a scenario where a user is writing a paper on dinosaurs. In this scenario, the user might utilize a network-based search engine to locate documents having interesting content about dinosaurs. The user might also separately try to locate the author, or authors, of one or more of the identified documents, and attempt to contact them to discuss their work on dinosaurs. Completely separately, the user might utilize a word processing application program to begin writing their paper. Because search, communication, and content creation are completely separate activities, this can be a time-consuming and frustrating process for document creators. Moreover, content located by search engines is often stale, which is also frustrating to users.

In addition to the inefficiency and frustration caused to users, completely separate search, communication, and content creation can also cause other types of inefficiencies. For example, and without limitation, in very large companies or other types of entities there are often two or more groups of people creating documents on the same topic, many times unbeknownst to one another. This duplication of effort can result in a very inefficient allocation of human resources, particularly at large scale.

Separate search, communication, and content creation can also result in the inefficient allocation of computing resources. For example, and without limitation, mass storage, memory, and network bandwidth might not be utilized efficiently in scenarios where completely separate search, communication, and content creation results in duplication of effort and inefficient allocation of human resources. For instance, the same or similar content might be duplicated on multiple mass storage devices or in memory. Similarly, inefficient searches might be performed in an attempt to locate document authors or collaborators. These searches can unnecessarily consume network bandwidth and other processing resources.

It is with respect to these and other considerations that the disclosure made herein is presented.

SUMMARY

Technologies are described herein for document collaboration discovery. Through an implementation of the technologies disclosed herein, aspects of document search, content creation, and collaboration are integrated in a manner that reduces or even eliminates the human resource inefficiencies caused by previous systems wherein these tasks are performed completely separately. Moreover, implementations of the technologies disclosed herein can also reduce the inefficient usage of computing resources, such as mass storage, memory, and network bandwidth, caused by previous systems wherein document search, content creation, and collaboration are separate. Technical benefits other than those specifically identified herein can also be realized through an implementation of the disclosed technologies.

According to one configuration disclosed herein, a collaborative document authoring environment is provided that allows users to discover, contribute to, and communicate about content that is being actively edited by other users. In particular, the collaborative authoring environment includes a collaboration system that provides functionality for enabling two or more users to collaborate on a document. For example, and without limitation, such users (which might be referred to herein as the "active editors" of a document) can be permitted to create, modify, delete, and/or otherwise edit the same document simultaneously. The collaboration system can also provide functionality for enabling active editors to engage in real-time messaging about a document that is being collaboratively edited. The collaboration system can also provide other types of functionality for enabling multiple active editors to collaboratively author documents.

In order to utilize the functionality provided by the collaboration system, each active editor can utilize a computing device configured to execute an application, which will be referred to herein as a "collaborative authoring application," for interacting with the functionality provided by the collaboration system. For instance, the collaborative authoring application can provide functionality for editing documents collaboratively, for communicating with other active editors regarding documents that are being edited, and/or other types of functionality.

In order to enable the functionality presented herein for document collaboration discovery, the collaboration authoring application can also be configured to transmit edits to a document being collaboratively edited to the collaboration system in real or near real time. For example, and without limitation, the collaboration authoring application can transmit words, sentences, paragraphs, or other units of a document being collaboratively edited to the collaboration system as the words, sentences, paragraphs, or other units are created or modified. In turn, the collaboration system can receive the edits to the document in real or near real time and index the edits to update a search index, also in real or near real time. In this manner, the collaboration system can index edits to a document as the edits are made in real or near-real time by the active editors of the document.

In some configurations, the collaboration system can also obtain metadata about a document being collaboratively edited from the collaboration authoring application, or another source, in real or near real time and index the metadata in the search index. The metadata can include, but is not limited to, data identifying the active editors of a document, data identifying search terms in queries made of the search index that located a document, data identifying previous changes to a document, data identifying one or more previous active editors of the document, and data identifying one or more real-time messaging sessions associated with a document. The collaboration system can also obtain and index, in real or near real time, other types of metadata associated with a document that is being, or has been, collaborative edited in other configurations.

The collaboration system also provides functionality for discovering documents that other users are currently collaborating on (a process which might be referred to herein as "document collaboration discovery"). For example, and without limitation, the collaboration system can receive a search query that includes one or more search terms from another user. Responsive to receiving the search query, the collaboration system can cause a search to be made of the search index for documents or metadata matching the supplied search terms. The collaboration system can then cause a user interface ("UI") to be presented to the user that includes the results of the search. The UI can include, for instance, the identification of any documents that are currently (i.e. at the time the search query is received) being collaboratively edited. The UI can also identify the active editors of the documents.

The UI can also include a UI control which, when selected, will cause a request to be transmitted to computing devices associated with the active editors of a document to admit the user that submitted the search query as an active editor of the document. The request can identify the user that submitted the search query and the search terms in the search query that resulted in the document being presented in the search results. This information can be presented to the active editors along with a UI control which, when selected, will admit the user that made the search query as an additional active editor of the document. Similarly, a UI control can be presented which, when selected, will deny the request to join the document as an active editor. If one of the active editors admits the user making the search query as an active editor, the user can be permitted to collaborate on the document in the same manner as the other active editors.

In some configurations, the UI can also include a UI control which, when selected, will cause a request to be transmitted to computing devices associated with the active editors to admit the user that submitted the search query to a real-time messaging session with one or more of the active editors of the document. The request can also identify the user that submitted the search query and the search terms in the search query that resulted in the document being collaboratively edited being presented in the search results. This information can be presented to the active editors along with a UI control which, when selected, will admit the user that made the search query to a real-time messaging session with one or more active editors of the document. Similarly, a UI control can be presented which will deny the request to join a real-time messaging session about the document.

If one or more of the active editors indicates that the user making the search query is to be admitted to a real-time messaging session, a real-time messaging session can be established between a computing device associated with the user making the search query and computing devices operated by one or more of the active editors. Alternately, the user making the search request can be admitted to an existing real-time messaging session between two or more of the active editors of the document.

It should be appreciated that the above-described subject matter can be implemented as a computer-controlled apparatus, a computer process, a computing system, or as an article of manufacture such as a computer readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
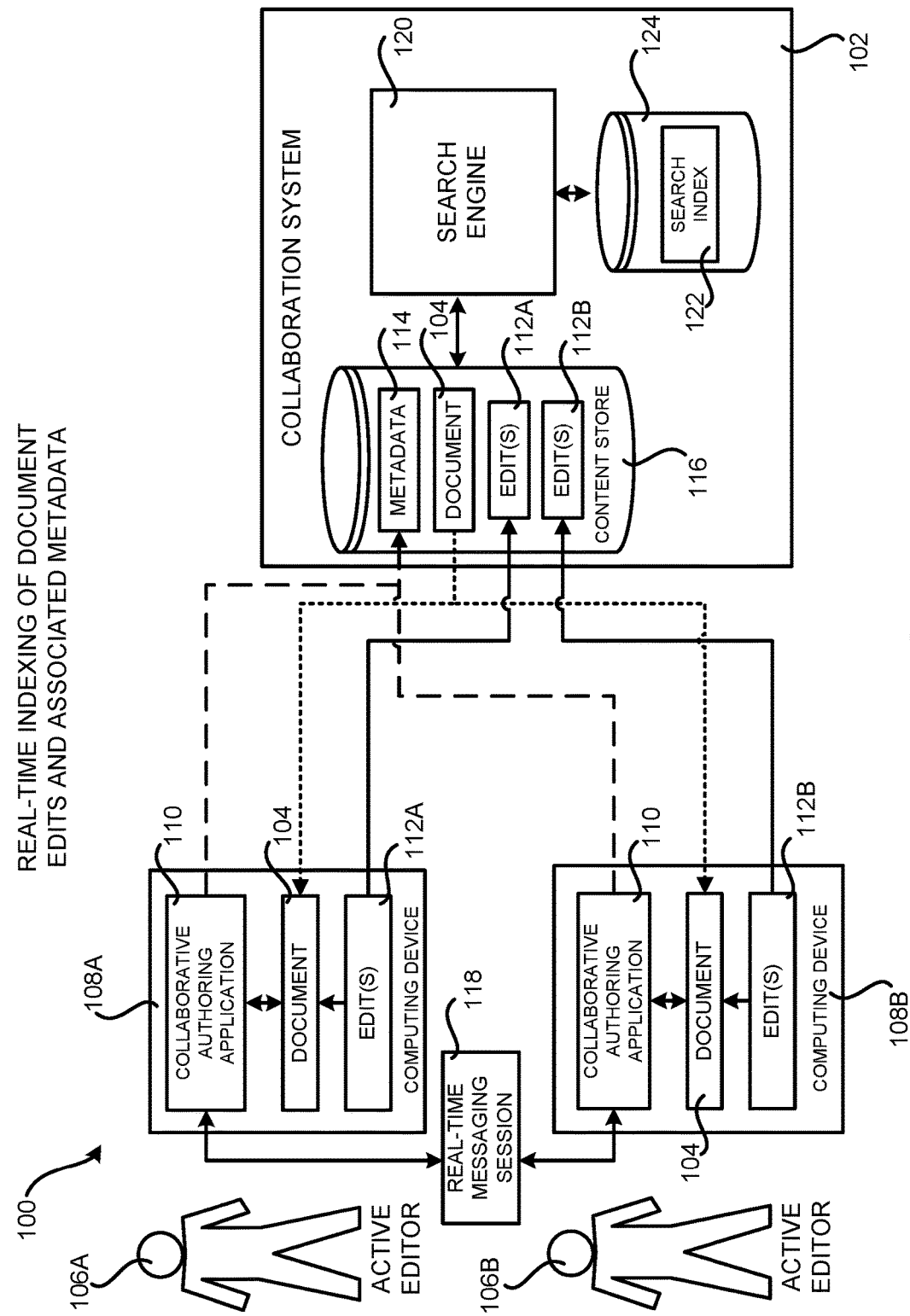
FIG. 1 is a network and software architecture diagram showing the configuration of a collaborative document authoring environment in which the technologies disclosed herein can be implemented according to one illustrative configuration.

The following detailed description is directed to technologies for document collaboration discovery. As discussed above, through an implementation of the technologies disclosed herein, aspects of document search, content creation, and collaboration are integrated in a manner designed to reduce or even eliminates the human resource inefficiencies and inefficient use of computing resources caused by previous systems wherein these tasks are performed completely separately. Technical benefits other than those specifically identified herein can also be realized through an implementation of the disclosed technologies.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration as specific configurations or examples. Referring now to the drawings, in which like numerals represent like elements throughout the several FIGS., aspects of various technologies for extending a federated graph with third-party data and metadata will be described.

FIG. 1 is a network and software architecture diagram showing the configuration of a collaborative document authoring environment 100 in which the technologies disclosed herein can be implemented, according to one illustrative configuration. As shown in FIG. 1, and described briefly above, the collaborative document editing environment 100 includes a collaboration system 102 that provides functionality for enabling two or more users to collaborate on a document 104. For example, and without limitation, such users (which might be referred to herein as the "active editors" 106A and 106B of the document 104) can be permitted to create, modify, delete, and/or otherwise edit the same document 104 simultaneously. The active editors 106 of a document 104 are users that have the document 104 open for editing in a suitable program.

The collaboration system 102 can also provide functionality for enabling the active editors 106 to engage in real-time messaging about a document 104 that is being collaboratively edited. In FIG. 1, for example, the users 106A and 106B are participating in a real-time messaging session 118. The collaboration system 102 can also provide other types of functionality for enabling multiple active editors 106 to collaboratively author documents 104.

In order to utilize the functionality provided by the collaboration system 102, each active editor 106 can utilize a computing device 108 that is configured to execute a collaborative authoring application 110 for interacting with the functionality provided by the collaboration system 102. The computing devices 108 can be, but are not limited to, desktop or laptop computers, smart mobile telephones, tablet devices, slate devices, video game devices, set top boxes, or other types of computing devices capable of connecting to a collaboration system 102 through a network (not shown in FIG. 1).

The collaborative authoring application 110 can provide functionality for editing a document 104 collaboratively with other active editors 106, for communicating with other active editors 106 regarding a document that is being edited, such as through a real-time messaging session 118, and/or other types of functionality. The document 104 can be a word processing document, a spreadsheet document, a presentation document, a drawing document, the text of a real-time communication session, a user's search history, program source code, or any other type of textual content.

In order to enable the disclosed functionality, and potentially other types of functionality, the collaboration authoring application 110 can also be configured to transmit edits 112 to a document 104 being collaboratively edited to the collaboration system 102 in real or near real time. For example, and without limitation, the collaboration authoring application 110 can transmit words, sentences, paragraphs, or other units of a document 104 being collaboratively edited to the collaboration system 102 as the words, sentences, paragraphs, or other units are created or modified by the active editors 106. In this manner, edits 112 to a document 104 being collaboratively edited can be transmitted to the collaboration system 102 with little or no human-perceptible lag.

In turn, the collaboration system 102 can receive the edits 112 to the document 104 in real or near real time, and store the edits 112 in an appropriate content store 116. In one configuration, the content store 116 is implemented as a graph that maintains relationships between a document 104, its associated metadata 114, edits 112 the document, and potentially other types of data. Other implementations can also be utilized in other configurations.

A search engine 120 operating within or in conjunction with the collaboration system 102 can also index the edits 112 to update a search index 122, also in real or near real time. For example, the search engine 120 can index the edits 112 within two seconds from the time the edits 112 are received in some configurations. The search index 122 can also be stored in an appropriate data store 124. In this manner, the collaboration system 102 can receive and index edits 112 to a document 104 as the edits 112 are made in real or near-real time by the active editors 106 of the document 104.

Figure 2:
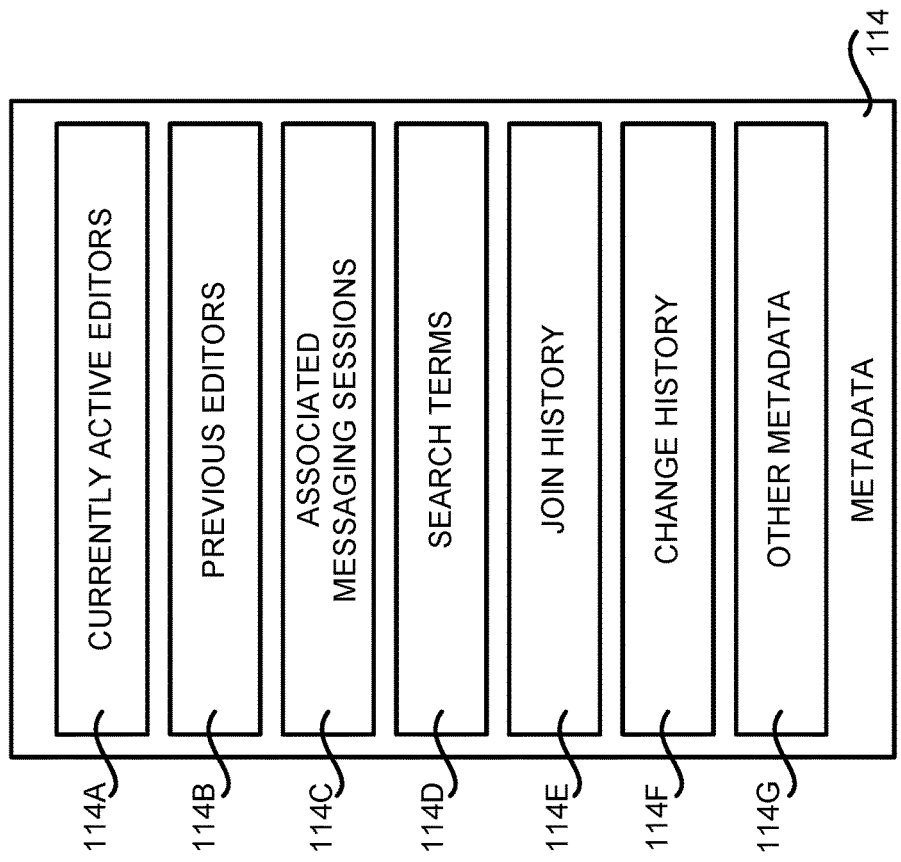
FIG. 2 is a data structure diagram showing aspects of an illustrative data structure that can be utilized to store metadata for use in document collaboration discovery in one particular configuration disclosed herein.

In some configurations, the collaboration system 102 can also obtain metadata 114 about a document 104 being collaboratively edited from the collaboration authoring application 110, or another source, in real or near real time. The collaboration system 102 can store the metadata 114 in the content store 116 or in another suitable location. The collaboration system 102 can also index the metadata 114 in the search index 122 in real or near real time. Referring momentarily to FIG. 2, several illustrative examples of the metadata 114 that can be received and indexed by the collaboration system 102 will be described.

FIG. 2 is a data structure diagram showing aspects of an illustrative data structure that can be utilized to store metadata 114 for use in document collaboration discovery in one particular configuration disclosed herein. As shown in FIG. 2, the metadata 114 can include, but is not limited to, metadata 114A identifying the currently active editors 106 of a document 104. The metadata 114 can also include metadata 114B identifying the previous active editors 106 of a document 104. The metadata 114 can also include metadata 114C including the contents of one or more real-time messaging sessions 118 associated with a document 104.

The metadata 114 can also include metadata 114D identifying search terms in queries made of the search index 122 that located the document 104. The metadata 114 can also include metadata 114E the specifies the history of users joining the document 104 for collaborative editing and/or joining real-time messaging sessions 118 about the document 104. The metadata 114 can also include metadata 114F identifying previous edits 112 to the document 104. The collaboration system 102 can also obtain and index, in real or near real time, other metadata 114G associated with a document 104 that is being, or has been, collaborative edited in other configurations. For example, the other metadata 114G can provide information about users that searched and located the document 104 such as, but not limited to, other documents 104 that the searching user is working on, other documents 104 that the searching user has recently read, information indicating the location in an organizational hierarchy of the searching user, other information about the searching user, and/or other search terms supplied by the searching user.

Turning back to FIG. 1, additional details regarding the functionality provided by the collaboration system 102 will be described. In particular, and as discussed briefly above, the search engine 120 also provides functionality for searching the search index 122 to identify documents 104 that are being actively collaborated upon. For example, and without limitation, a user (not shown in FIG. 1) can provide a search query that includes one or more search terms to the search engine 120. The search engine 120 can perform a search for relevant documents 104 using the search index 122. If one or more documents 104 are located that are relevant to the search query, the documents 104 can be identified to the user that submitted the search query in an appropriate UI (also not shown in FIG. 1). The active editors 106 of each relevant document 104 can also be identified in the UI. Additionally, UI controls for requesting to become an active editor 106 (or a reviewer, approver, or observer) of each document 104 and/or for joining a real-time messaging session 118 with one or more of the active editors 106 of each document 104 can also be presented. Additional details regarding these aspects will be provided below with regard to FIGS. 4A-6.

Figure 3:
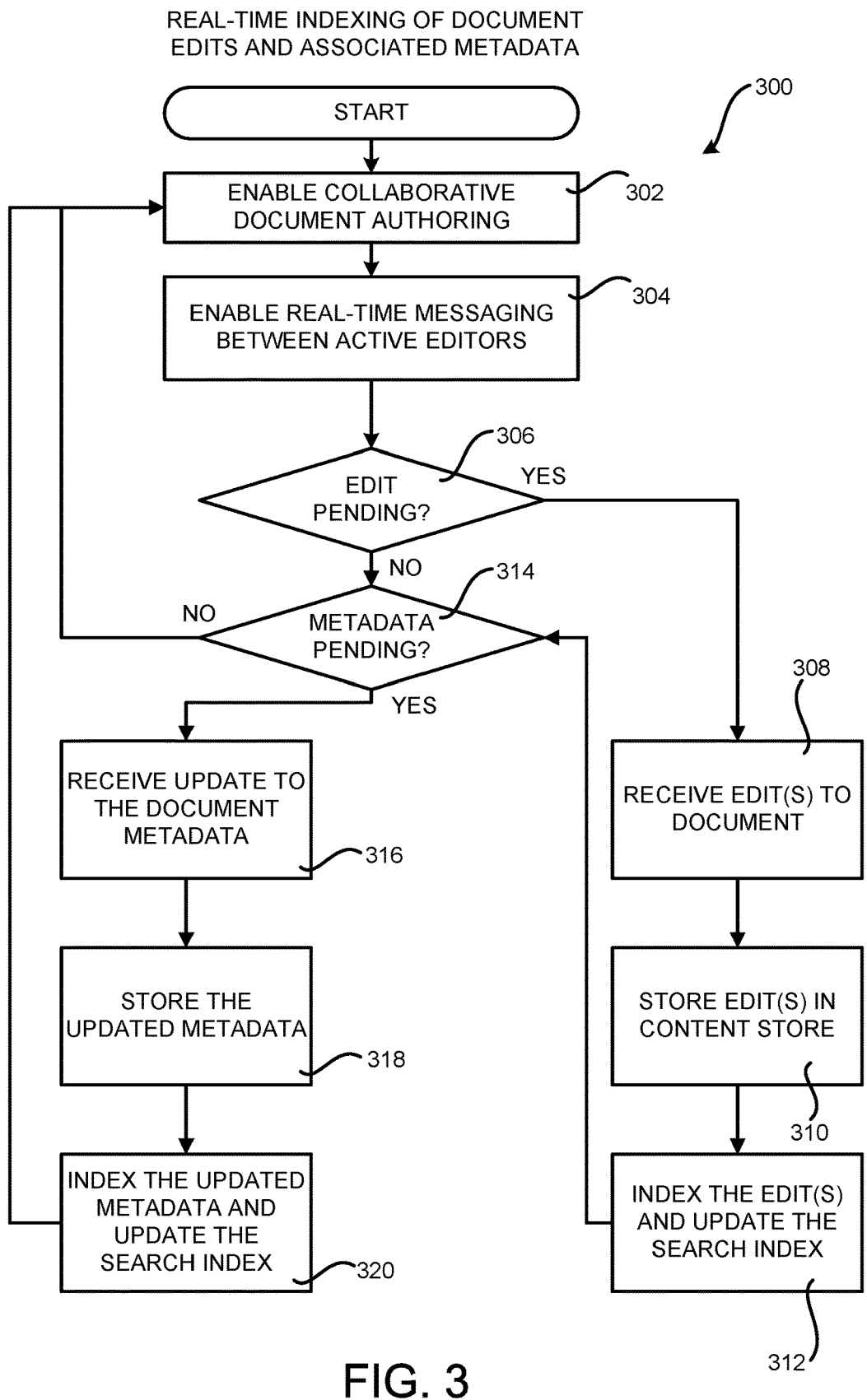
FIG. 3 is a flow diagram showing aspects of a routine for performing real-time indexing of document edits and associated metadata for use in document collaboration discovery, according to one configuration.

FIG. 3 is a flow diagram showing aspects of a routine 300 for performing real-time indexing of document edits 112 and associated metadata 114 for use in document collaboration discovery, according to one configuration. It should be appreciated that the logical operations described herein with regard to FIG. 3 and the other FIGS. can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 300 begins at operation 302, where the collaboration system 102 enables collaborative document authoring by two or more active editors, such as the active editors 106A and 106B. As discussed above, this functionality includes the ability for each of the active editors 106 to simultaneously edit a document 104 and/or other types of functionality in other configurations. As also discussed above, in some configurations the collaboration system 102, or another system operating in conjunction therewith, can also provide functionality for enabling real-time messaging between active editors 106. This occurs at operation 304.

From operation 304, the routine 300 proceeds to operation 306, where the collaboration system 102 determines whether an edit 112 to a document 104 is pending processing. As discussed above, the edits 112 can be transmitted in real or near real time as they are made by the active editors 106. If, at operation 306, the collaboration system 102 determines that an edit 112 is pending, the routine 300 proceeds to operation 308 where the edit 112 is received. The routine 300 then proceeds from operation 308 to operation 310, where the edit 112 is stored in the content store 116, or in another suitable location, in the manner described above.

Once the received edit 112 has been stored, the routine 300 proceeds to operation 312, where the search index 122 is updated to reflect the received edit 112. Because the edits 112 are generally small (e.g. a word, sentence, or paragraph), updating the search index 122 can be performed quickly. In this regard, it is to be appreciated that, in some configurations, the operations 308, 310, and 312 are performed together as a single transaction. In this manner, edits 112 can be received, stored, and indexed in real or near real time as the edits 112 are made by the active editors 106. From operation 312, the routine 300 proceeds to operation 314, which is described below.

If, at operation 306, the collaboration system 102 determines that an edit 112 is not pending processing, the routine 300 proceeds to operation 314. At operation 314, the collaboration system 102 determines whether a metadata 114 update is pending processing. As discussed above, updates to the metadata 114 associated with a document 104 can also be transmitted in real or near real time as changes to the metadata 114 are made. If, at operation 314, the collaboration system 102 determines that metadata 114 is pending, the routine 300 proceeds to operation 316 where the metadata 114 is received. The routine 300 then proceeds from operation 316 to operation 318, where the metadata 114 is stored in the content store 116, or in another suitable location, in the manner described above.

Once the metadata 114 has been stored in the content store 116, the routine 300 proceeds to operation 320, where the search index 122 is updated to reflect the received metadata 114. Because changes to the metadata 114 are also generally small, updating the search index 122 to reflect changes to the metadata 114 for a document 104 can also be performed quickly. As with the processing of the edits 112, the operations 316, 318, and 320 can be performed together as a single transaction. In this manner, updates to the metadata 114 can be received, stored, and indexed in real or near real time as the metadata 114 is changed. From operation 320, the routine 300 proceeds back to operation 302, where additional edits 112 and metadata 114 can be processed in a similar manner.

Figure 4A:
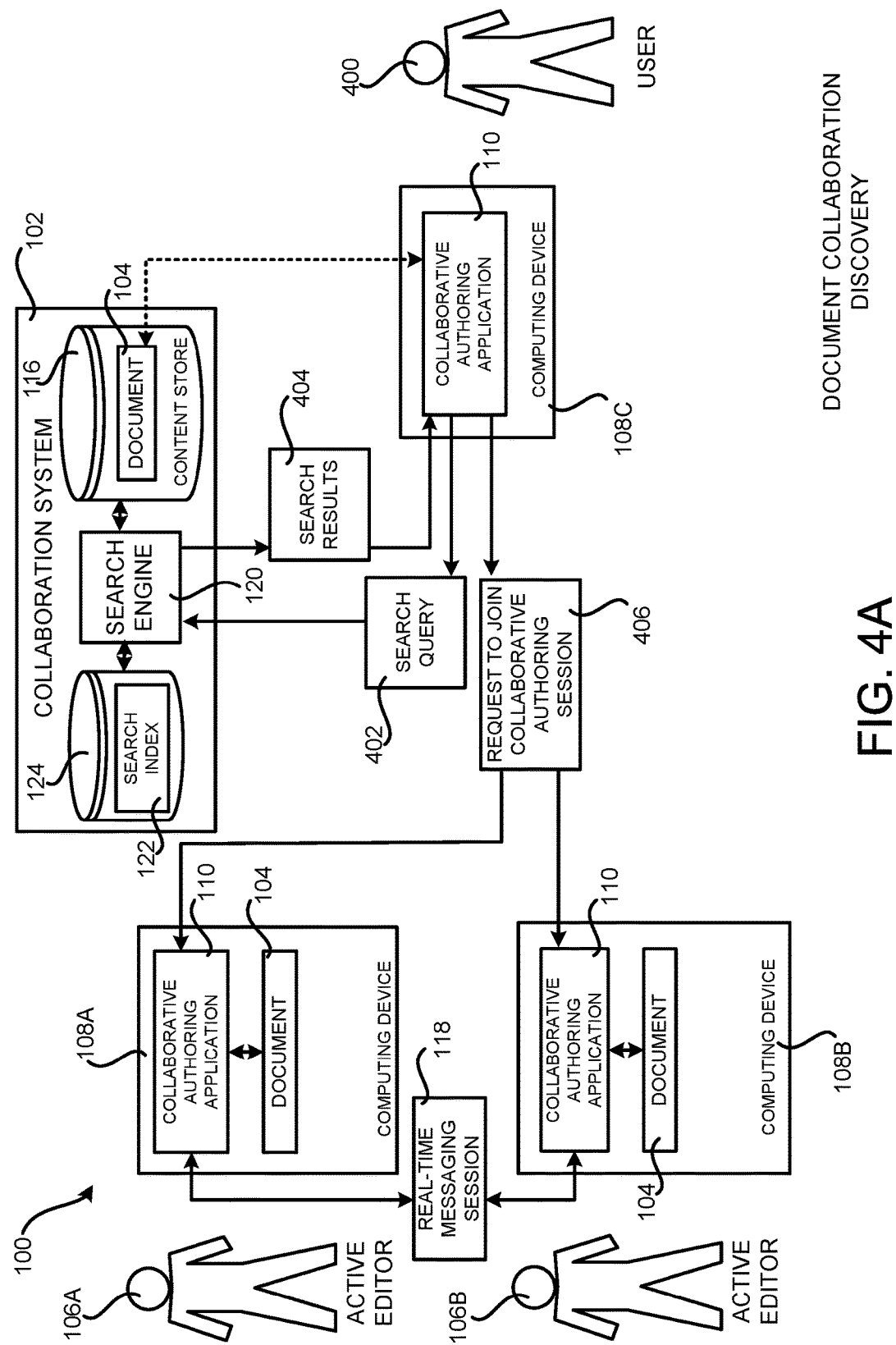
FIGS. 4A-4B are network and software architecture diagrams showing additional aspects of the collaborative document editing environment shown in FIG. 1 configured to provide functionality for document collaboration discovery.
Figure 4B:
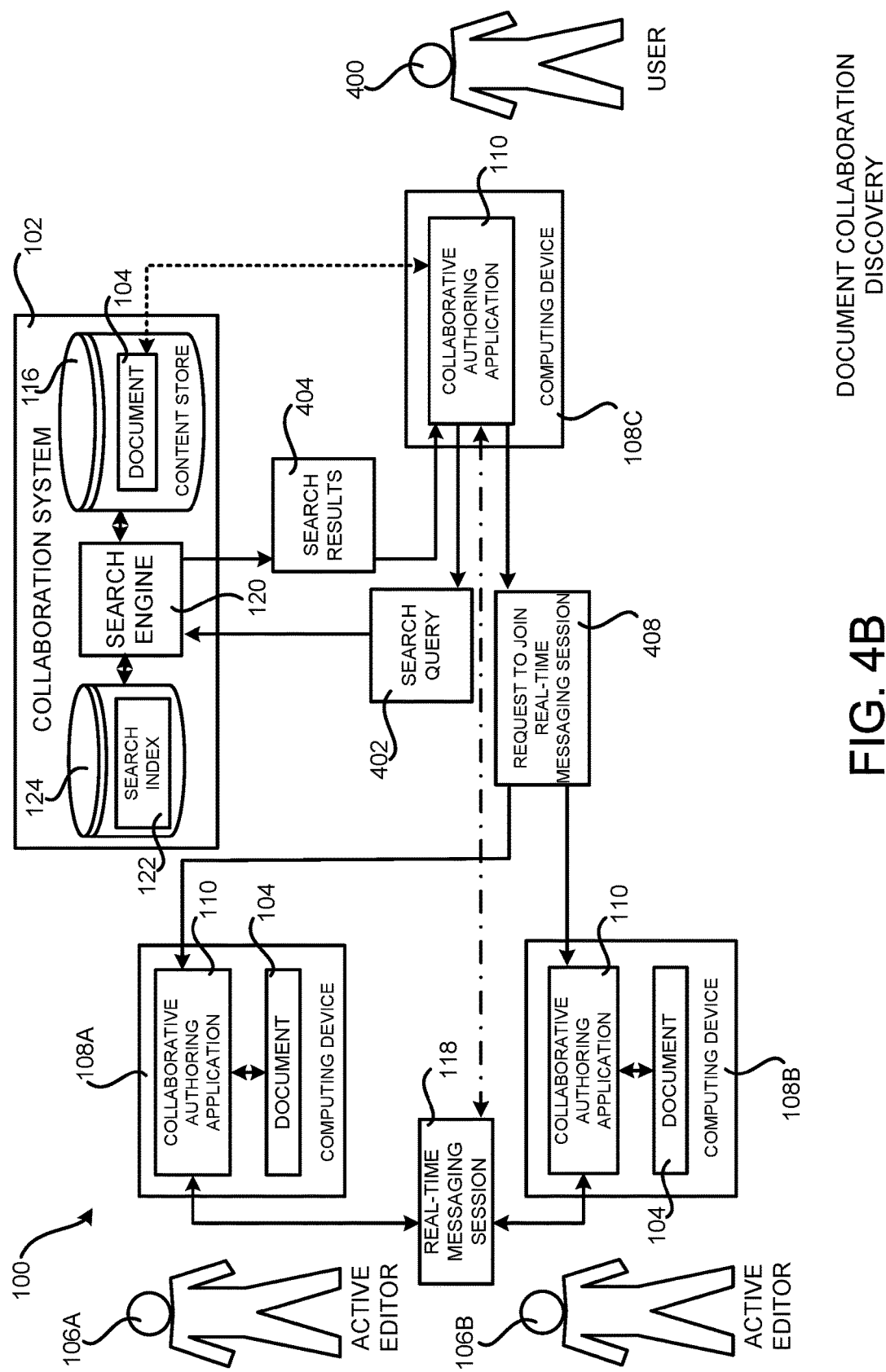

FIGS. 4A-4B are network and software architecture diagrams showing additional aspects of the collaborative document authoring environment 100 shown in FIG. 1 and described above, which is configured to provide functionality for document collaboration discovery. As shown in FIG. 4A, and described briefly above, the collaboration system 102 also provides functionality for discovering documents 104 that other users (i.e. the active editors 106) are actively collaborating on (a process which might be referred to herein as "document collaboration discovery").

For example, and without limitation, the search engine 120 that operates in conjunction with the collaboration system 102 can receive a search query 402 that includes one or more search terms. In the example shown in FIG. 4A, for instance, a user 400 has utilized a computing device 108C executing the collaborative authoring application 110 to submit a search query 402 to the search engine 120.

Responsive to receiving the search query 402, the search engine 120 performs a search of the search index 122 for documents 104 or metadata 114 matching the supplied search terms. The collaboration system 102 can then cause a UI to be presented to the user 400 that includes the search results 404. The UI can include, for instance, the identification of any documents 104 that are currently (i.e. at the time the search query 402 is received being collaboratively edited. The UI can also identify the active editors 106 of the documents identified documents 104. In one configuration, the UI is presented by the collaborative authoring application 110. The UI can be presented by other components in other configurations. In this regard, it is to be appreciated that search results 404 might not be presented, or might be truncated, to a user 400 that is not authorized to view the search results 404.

The UI presented by the collaborative authoring application 110 can also include a UI control (not shown in FIG. 4A or 4B) which, when selected, will cause a request 406 to be transmitted to computing devices 108 associated with the active editors 106 of a document 104 to admit the user 400 that submitted the search query 402 as an active editor of the document 104. The request 406 can identify the user 400 that submitted the search query 402 and the search terms in the search query 402 that resulted in the document 104 being presented in the search results 404.

This information can be presented to the active editors 106 along with a UI control which, when selected, will admit the user 400 that made the search query 402 as an additional active editor 106 of the document 104. Similarly, a UI control can be presented to the active editors 106 which, when selected, will deny the request 406 to join the document 104 as an active editor 106. If one of the active editors 106 admits the user 400 making the search query 402 as an active editor 106, the user 400 can be permitted to collaborate on the document 104 in the same manner as the other active editors 106.

In some configurations, the UI presented to the user 400 that submitted the search query 402 can also include a UI control (not shown in FIG. 4A or 4B) which, when selected, will cause a request 408 (shown in FIG. 4B) to be transmitted to computing devices 108 associated with the active editors 106 to admit the user 400 that submitted the search query 402 to a real-time messaging session 118 with one or more of the active editors 106 of the document. The request 408 can also identify the user 400 that submitted the search query 402 and the search terms in the search query 402 that resulted in the document 104 being collaboratively edited being presented in the search results 404. This information can be presented to the active editors 106 along with a UI control which, when selected, will admit the user 400 that made the search query 402 to a real-time messaging session 118 with one or more active editors 106 of the document 104. Similarly, a UI control can be presented which will deny the request 408 from the user 400 to join a real-time messaging session about the document 104.

If one or more of the active editors 106 admits the user 400 making the search query 402 to a real-time messaging session 118, a real-time messaging session 118 can be established between the user 400 making the search query 402 and one or more of the active editors 106. Alternately, the user 400 making the search request 402 can be admitted to an existing real-time messaging session 118 between two or more of the active editors 106 of the document 104. Additional details regarding several illustrative UIs for presenting the search results 404 will be provided below with regard to FIGS. 5A and 5C. Additional details regarding one illustrative UI for presenting the request 406 to join the collaborative authoring session 406 will be described below with regard to FIG. 5B.

Figure 5A:
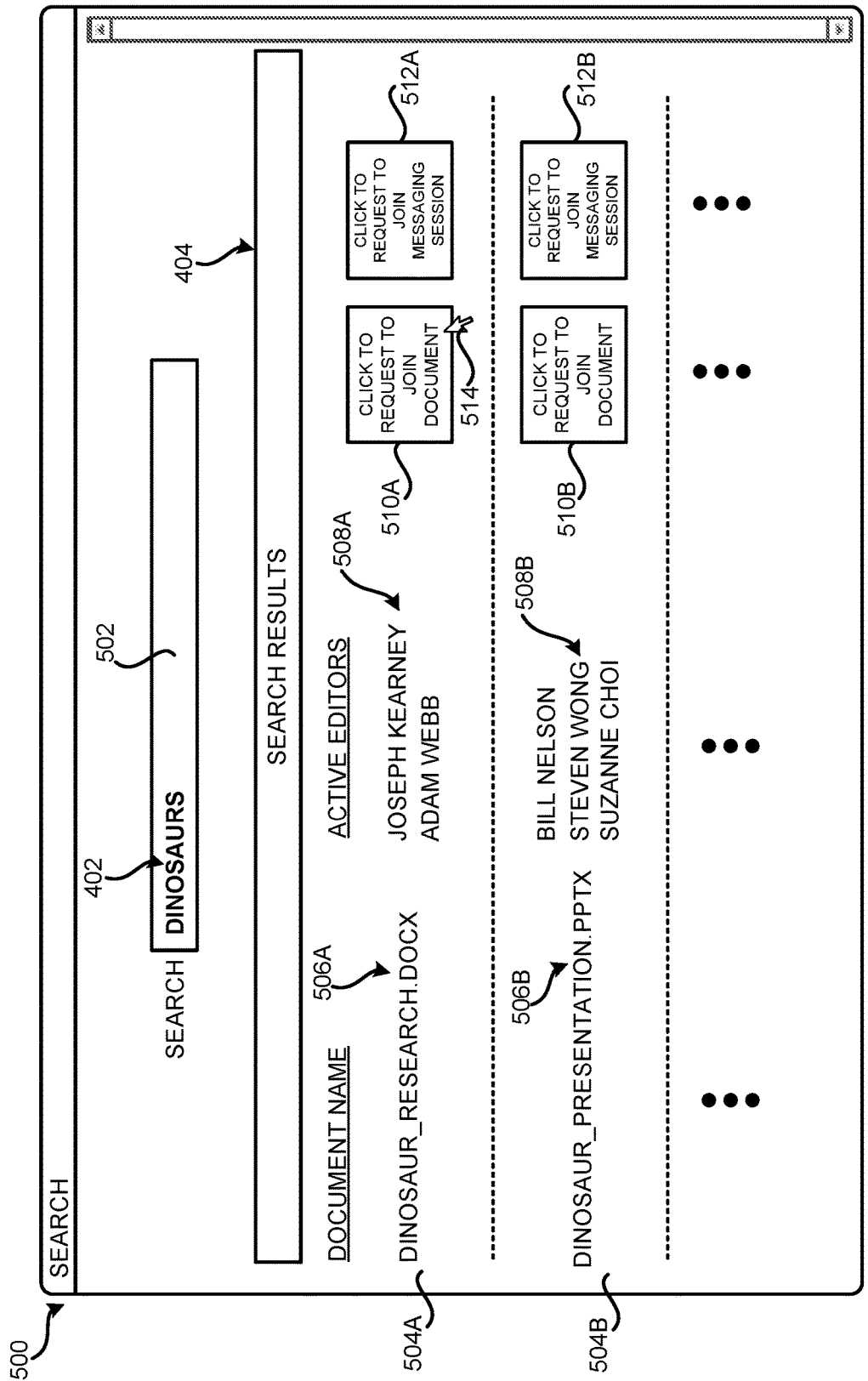
FIGS. 5A-5C are user interface diagrams showing various illustrative user interfaces that can be provided for use in document collaboration discovery, according to various configurations disclosed herein.
Figure 5B:
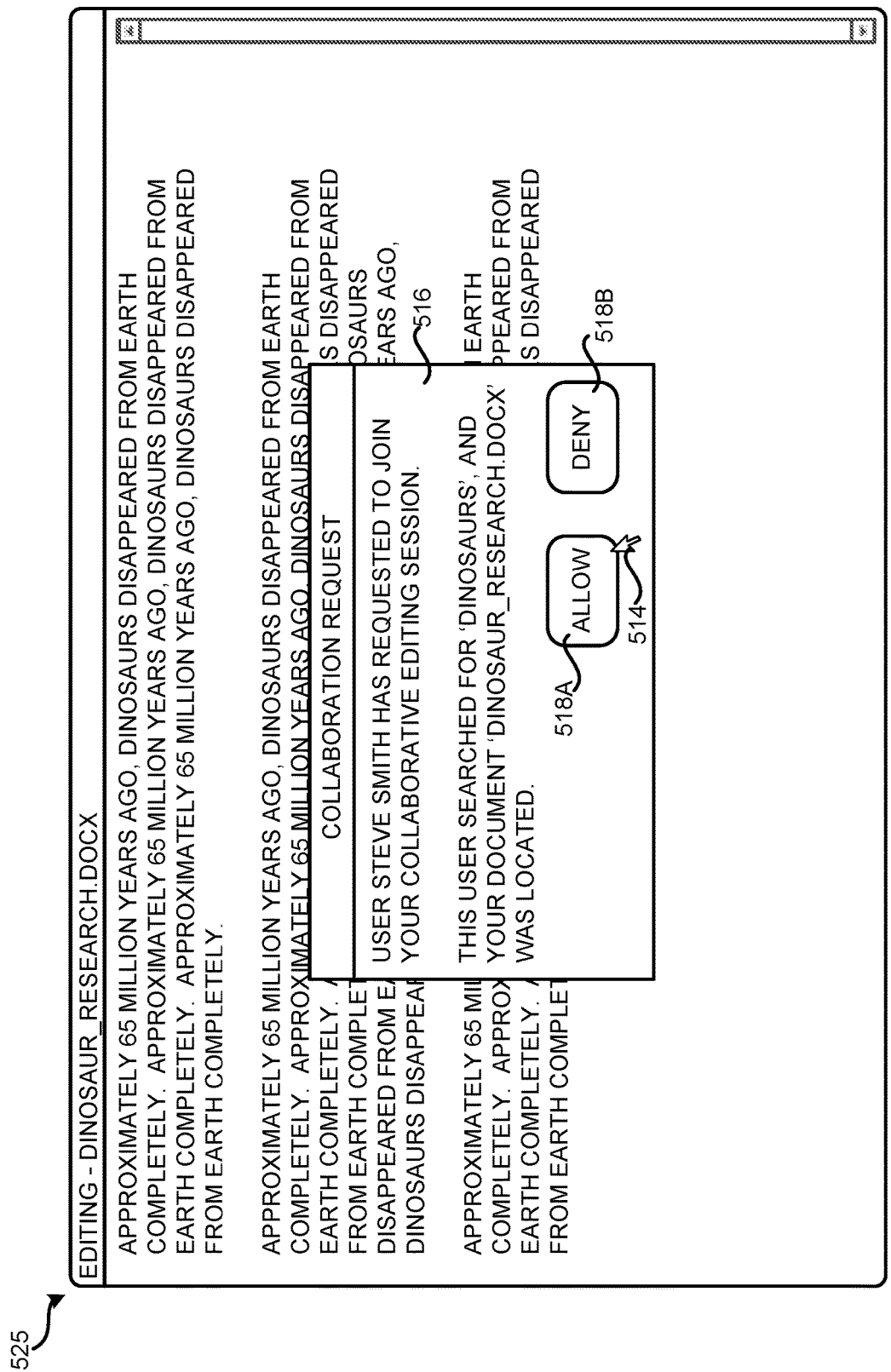
Figure 5C:
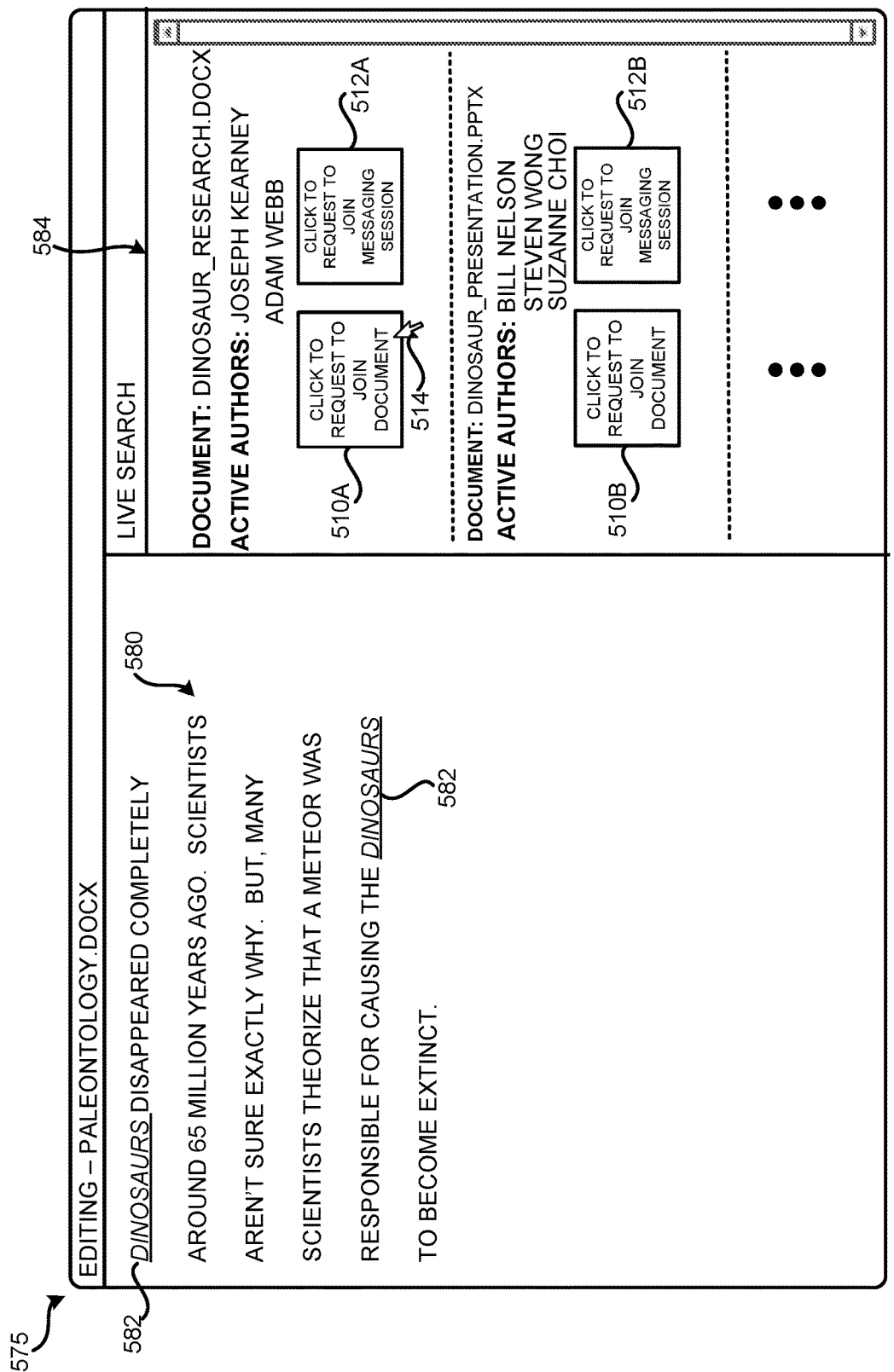

FIGS. 5A-5C are user interface diagrams showing several illustrative UIs 500, 525, and 575, respectively, that can be provided for use in document collaboration discovery, according to various configurations disclosed herein. In particular, FIG. 5A shows a UI 500 that can be presented by the collaborative authoring application 110 to a user 400 that desires to discover documents 104 that are being actively collaborated upon. In this example, the UI 500 includes a search field 502 in which the user 400 can specify one or more search terms 402. In this example, the user 400 has specified the word "dinosaur" as a search term 402.

The UI 500 also includes a list of search results 404. Each of the items 504 in the list of search results 404 corresponds to a document 104 that is being actively edited by two or more active editors 106 at the time that the search terms 402 are received. The UI 500 also includes identifiers 506 for each of the documents 104 returned by the search. For example, the identifier 506A for the item 504A lists a document named "DINOSAUR_RESEARCH.DOCX" and the identifier 506B for the item 504B lists a document named "DINOSAUR_PRESENTATION.PPTX."

The UI 500 also includes identifiers 508 for the active editors 106 of each document referenced in the search results 404. For instance, in the example shown in FIG. 5A, the indicator 508A indicates that two active editors 106 (i.e. Joseph Kearney and Adam Webb) are collaboratively editing the document 104 entitled "DINOSAUR_RESEARCH-.DOCX." Similarly, the indicator 508B indicates that three active editors 106 (i.e. Bill Nelson, Steven Wong, and Suzanne Choi) are collaboratively editing the document 104 entitled "DINOSAUR_PRESENTATION.PPTX."

As described briefly above, the UI 500 presented by the collaborative authoring application 110 can also include UI controls 510 which, when selected, will cause a request 406 to be transmitted to computing devices 108 associated with the active editors 106 of a document 104 to admit the user 400 that submitted the search query 402 as an active editor of the document 104. In the example shown in FIG. 5A, for instance, the UI control 510A can be selected using the mouse cursor 514, for instance, to cause a request 406 to be transmitted to the users "Joseph Kearney" and "Adam Webb" to join in the collaborative editing of the document 104 entitled "DINOSAUR_RESEARCH.DOCX." Similarly, the UI control 510B can be selected to cause a request 406 to be transmitted to the users Bill Nelson, Steven Wong, and Suzanne Choi, to join in the collaborative editing of the document 104 entitled "DINOSAUR_PRESENTATION-.PPTX."

In some configurations, the UI 500 presented to the user 400 that submitted the search query 402 can also include UI control 512 which, when selected, will cause a request 408 (shown in FIG. 4B) to be transmitted to computing devices 108 associated with the active editors 106 to admit the user 400 that submitted the search query 402 to a real-time messaging session 118 with one or more of the active editors 106 of the document. In the example shown in FIG. 5A, for instance, the UI control 512A can be selected to cause a request 408 to be transmitted to the users "Joseph Kearney" and "Adam Webb" to join in a real-time messaging session 118 regarding the document 104 entitled "DINOSAUR_RE-SEARCH.DOCX." Similarly, the UI control 512B can be selected to cause a request 408 to be transmitted to the users Bill Nelson, Steven Wong, and Suzanne Choi, to join in a real-time messaging session 118 regarding the document 104 entitled "DINOSAUR_PRESENTATION.PPTX."

FIG. 5B shows a UI 525 that can be presented to the active editors 106 by the collaborative authoring application 110 following the selection of one of the UI controls 510 for requesting to join a document 104 as an active editor 106. As shown in FIG. 5B, a dialog box 516 or other type of UI control can be presented to the active editors 106 indicating that a user 400 (in this example, a user 400 named "Steve Smith") has requested to join the document 104 as an active editor 104. The dialog box 516 or other type of UI control can also identify the search terms that led the user 400 to the document 104. In this example, the user 400 searched for "dinosaurs," which located the document entitled "DINO-SAUR_RESEARCH.DOCX." Through the presentation of this information, the active editors 106 can learn the identity of the user 400 that is requesting to become an active editor 106 and the search terms that led the user 400 to the document 104.

As shown in FIG. 5A, the UI 525 can also include UI controls 518A and 518B which, when selected, will allow the request 406 or deny the request 406, respectively. In this example, an active editor 106 has selected the UI control 518A with the mouse cursor 514 in order to allow the user 400 to become an active editor 104 of the document entitled "DINOSAUR_RESEARCH.DOCX." It should be appreciated that a similar UI can also be presented when a user 400 makes a request 408 to join a real-time messaging session 118 with active editors 106 of a document 104.

It should be further appreciated that the user interface 525 can also include other information that might be helpful to the active editors 106 in determining whether to admit the requesting user 400 to a collaborative editing or real-time messaging session 118. For example, and without limitation, the UI 525 might include information indicating the relationship between the requesting user 400 and the active editor 106 within an organization. For instance, a portion of an organizational chart might be presented in the UI 525. In another configuration, the UI 525 might indicate whether the user 400 is a member of an active editor's contact list or social network. The UI 525 might also indicate other documents that the user 400 has authored, biographic information about the user 400, a photo or video of the user 400, and/or contact information for the user 400, such as their email address, phone number, office location. Other types of information can be presented in other configurations.

FIG. 5C shows another example UI 575 that can be presented to a user 400 of the collaborative editing application 110. In this example, the user 400 is editing text 580 of a document. The collaborative editing application 110 examines the text 580 being edited and automatically performs searches using terms 582 located in the text 580. If relevant search results 404 are returned by the searches, the search results 404 can be presented in the search pane 584.

For instance, in the example shown in FIG. 5C, the term 'dinosaurs' was located in the text 582 and utilized to generate a search query 402 to the search engine 120. Because relevant search results 404 were returned by the search, the terms 582 can be underlined or otherwise emphasized to indicate that documents 104 relating to the terms 582 are being actively collaborated upon. Additionally, the search results 404 are shown in the search pane 584 including, for each relevant document 104, the name of the document, the active authors, and UI controls 510 and 512 for requesting to join the document 104 as an active editor 106 and to join a real-time messaging session 118 about the document 104.

It should be appreciated that other UI controls and information can also be presented in other configurations. For example, and without limitation, in one configuration a user 400 can specify a "standing query." As standing query is a query that is automatically performed periodically. The results of the search can be presented to the user continually or when new documents 104 are identified that match the terms specified in the standing query. Other types of searches can be performed in other configurations.

Figure 6:
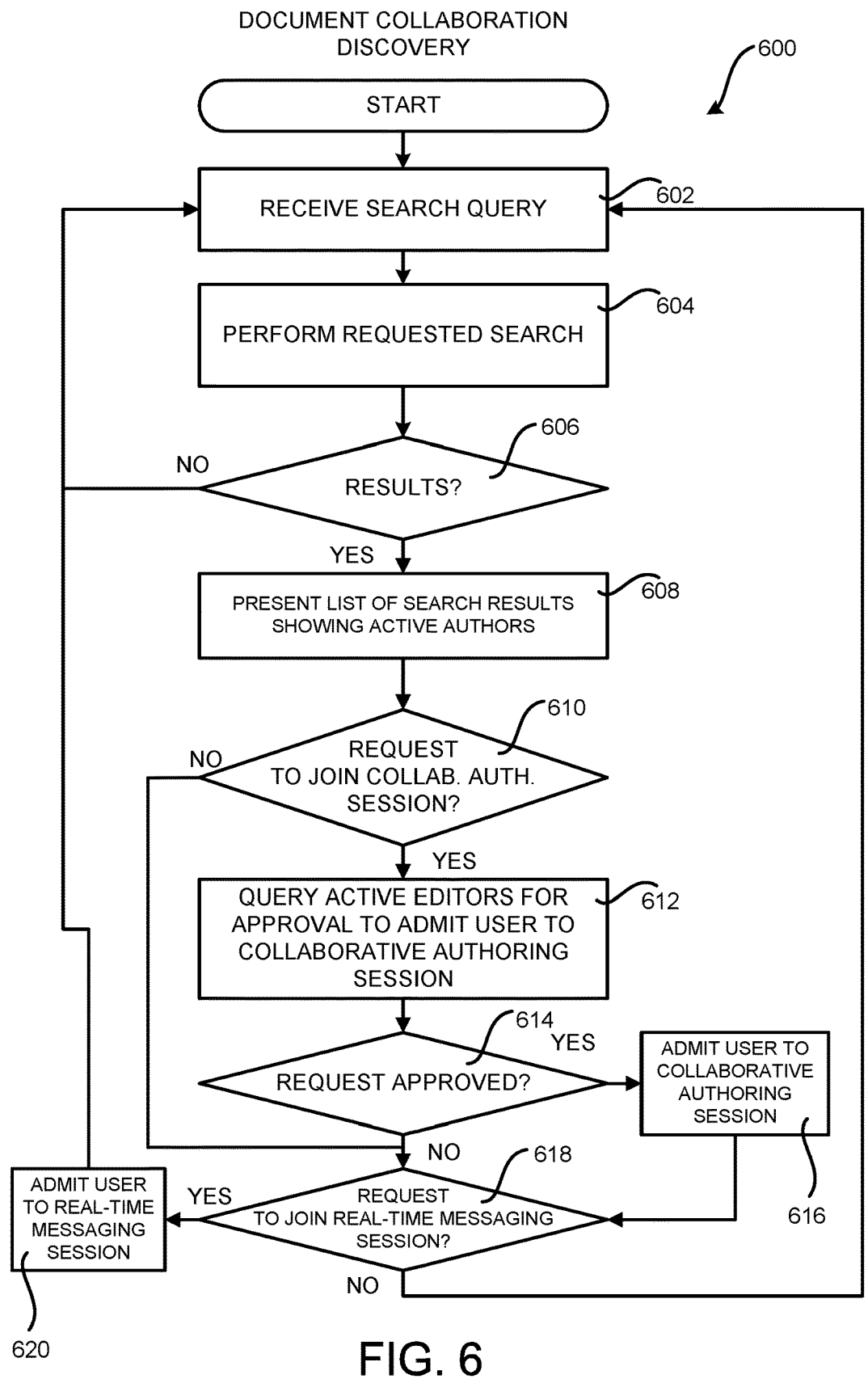
FIG. 6 is a flow diagram showing aspects of a routine for performing document collaboration discovery, according to one configuration.

FIG. 6 is a flow diagram showing aspects of a routine 600 for performing document collaboration discovery, according to one configuration. The routine 600 begins at operation 602, where the search engine 120 receives a search query 402 including one or more search terms. In some configurations, the user 400 providing the search query 402 can indicate that only documents 104 that have been actively editing in a previous timeframe (e.g. the last 15 minutes) are to be returned by the search query 402. The user 400 can also define other aspects of the manner in which the search query 402 is to be performed in other configurations.

The routine 600 then proceeds from operation 602 to operation 604, where the search engine 120 performs a search of the search index 122 utilizing the search terms. If relevant search results 404 are returned by the search, the routine 600 proceeds from operation 606 to operation 608.

At operation 608, the list of search results 404 is presented in an appropriate UI, such as the illustrative UIs 500 and 575 shown in FIGS. 5A and 5C, respectively. In this regard, it is to be appreciated that the search results 404 can be ranked based upon their relevance in various configurations. The relevance of a particular search result can be determined, at least in part, based upon the metadata 114 associated with the search result. For example, and without limitation, recent document joins and subsequent edits by users can cause the relevance of a particular search result to rise. The relevance of a particular document 104 in the search results 404 can be further influenced based upon how often the document 104 is appearing in the search results 404, how often users 400 are requesting to collaborate on a document 104 in the search results 404, the active editors 106 that are currently editing a document 104 in the search results 404 and their relationship to the searcher, the previous active editors 106 of a document 104 in the search results 404, and/or other factors or metadata 114.

The routine 600 then proceeds from operation 608 to operation 610, where the collaboration system 102 determines whether a request 406 has been received from the user 400 to join a document 104 identified in the search results 404 as an active editor 106. If such a request has been received, the current active editors 106 of the document 104 are queried to admit the user 400 as an active editor 106. As discussed above, a UI 525, discussed above with regard to FIG. 5B, can be presented to the current active editors 106 to obtain their consent to add the user 400 as an active editor 106.

If one or more of the active editors 106 approves the request 406, the routine 600 proceeds from operation 614 to operation 616, where the user 400 is admitted to the document 104 as an active editor 106. If the request 406 is declined, the routine 600 proceeds from operation 614 to operation 618. In this regard, it is to be appreciated that, in some configurations, an active editor 106 does not need to provide approval before the user 400 is admitted as an active editor 106 of the document 104. In these configurations, the user 400 is automatically admitted to the document 104 as an active editor 106.

At operation 618, the collaboration system 102 determines whether a request 408 has been received from the user 400 to join a real-time messaging session 118 regarding a document 104 identified in the search results 40. If such a request has been received, the current active editors 106 of the document 104 are queried to admit the user 400 to the real-time messaging session 118.

If one or more of the active editors 106 approves the request 408, the routine 600 proceeds from operation 618 to operation 620, where the user 400 is admitted to the real-time messaging session 118. If the request 408 is declined, the routine 600 proceeds from operation 618 back to operation 602, where additional search queries 402 can be processed in the manner described above. In this regard, it is to be appreciated that, in some configurations, an active editor 106 does not need to provide approval before the user 400 is admitted to a real-time messaging session 118 with one or more of the active editors 106 of the document 104. In these configurations, the user 400 is automatically admitted to the real-time messaging session 118.

It should be appreciated that the various software components described above executing on the computing devices 108 and within the collaboration system 102 can be implemented using or in conjunction with binary executable files, dynamically linked libraries ("DLLs"), application programming interfaces ("APIs"), network services, script files, interpreted program code, software containers, object files, bytecode suitable for just-in-time ("JIT") compilation, and/or other types of program code that can be executed by a processor to perform the operations described herein with regard to FIGS. 1-6. Other types of software components not specifically mentioned herein can also be utilized.

Figure 7:
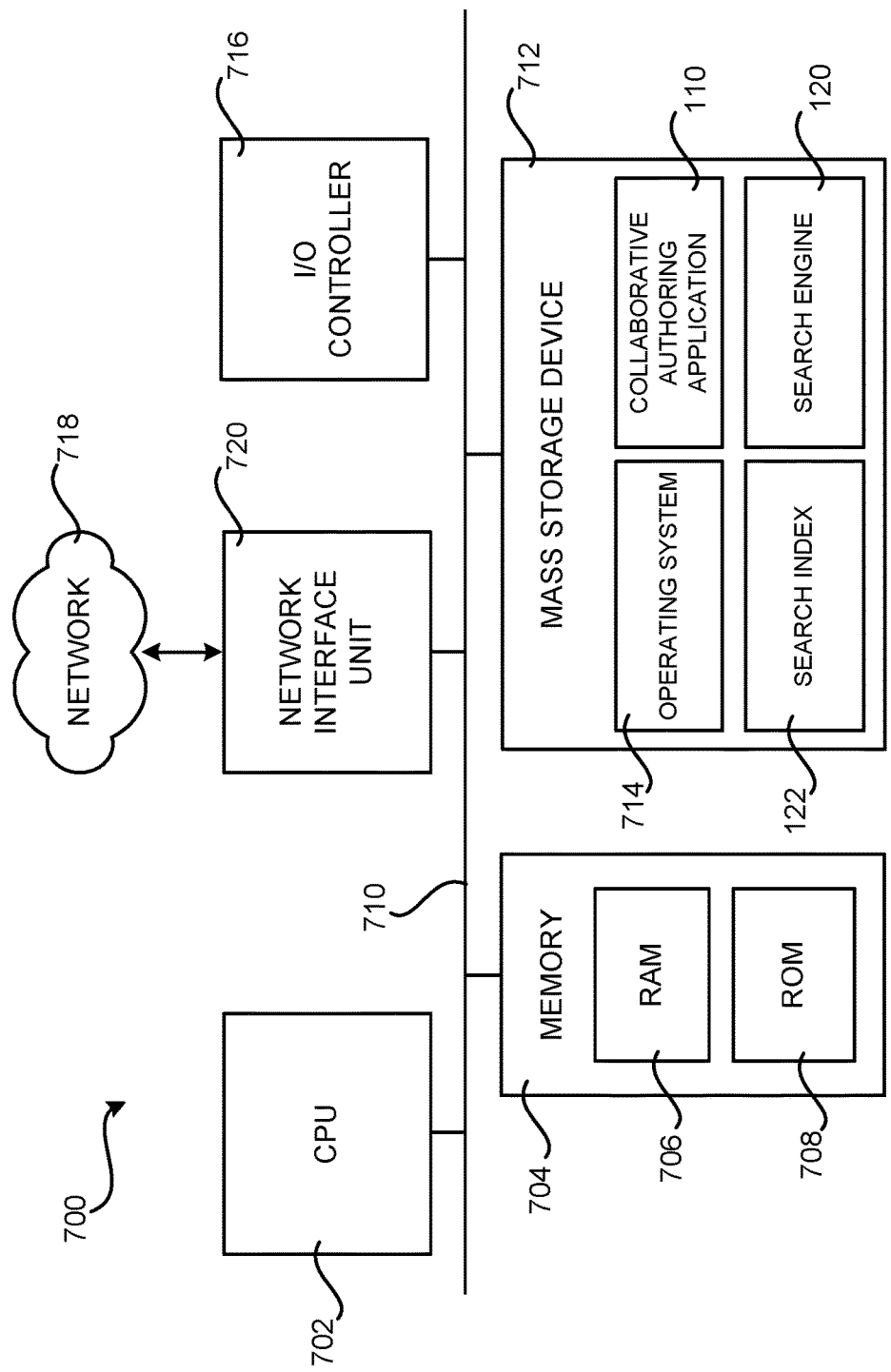
FIG. 7 is a computer architecture diagram showing an illustrative computer hardware and software architecture for a computing system that is capable of implementing aspects of the technologies presented herein.

FIG. 7 is a computer architecture diagram that shows an architecture for a computer 700 capable of executing the software components described herein. The architecture illustrated in FIG. 7 is an architecture for a server computer, mobile phone, e-reader, smart phone, desktop computer, netbook computer, tablet computer, laptop computer, or another type of computing device suitable for executing the software components presented herein.

In this regard, it should be appreciated that the computer 700 shown in FIG. 7 can be utilized to implement a computing device capable of executing any of the software components presented herein. For example, and without limitation, the computing architecture described with reference to the computer 700 can be utilized to implement the collaborative authoring application 110, the search engine 120, other components within the collaboration system 102 or executing on the computing devices 108, and/or to implement other types of computing systems for executing any of the other software components described above.

The computer 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer 700, such as during startup, is stored in the ROM 708. The computer 700 further includes a mass storage device 712 for storing an operating system 714 and one or more programs including, but not limited to the collaborative authoring application 110, the search engine 120, and/or the search index 122 depending upon the use of the computer 700. The mass storage device 712 can also be configured to store other types of programs and data described herein but not specifically shown in FIG. 7.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid state memory devices, CD-ROM, digital versatile disks ("DVD"), HD-DVD, BLU-RAY, or other optical storage disks, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 718. The computer 700 can connect to the network 718 through a network interface unit 720 connected to the bus 710. It should be appreciated that the network interface unit 720 can also be utilized to connect to other types of networks and remote computer systems. The computer 700 can also include an input/output controller 716 for receiving and processing input from a number of other devices, including a keyboard, mouse, touch input, or electronic stylus (not shown in FIG. 7). Similarly, the input/output controller 716 can provide output to a display screen, a printer, or other type of output device (also not shown in FIG. 7).

It should be appreciated that the software components described herein, such as but not limited to the collaborative authoring application 110, can, when loaded into the CPU 702 and executed, transform the CPU 702 and the overall computer 700 from a general-purpose computing system into a special-purpose computing system customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein, such as but not limited to the collaborative authoring application 110. These computer-executable instructions can transform the CPU 702 by specifying how the CPU 702 transitions between states, thereby transforming the transistors or other discrete hardware elements constituting the CPU 702.

Encoding the software modules presented herein, such as the collaborative authoring application 110, can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software components presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It should also be appreciated that the architecture shown in FIG. 7 for the computer 700, or a similar architecture, can be utilized to implement other types of computing devices, including hand-held computers, embedded computer systems, mobile devices such as smartphones and tablets, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
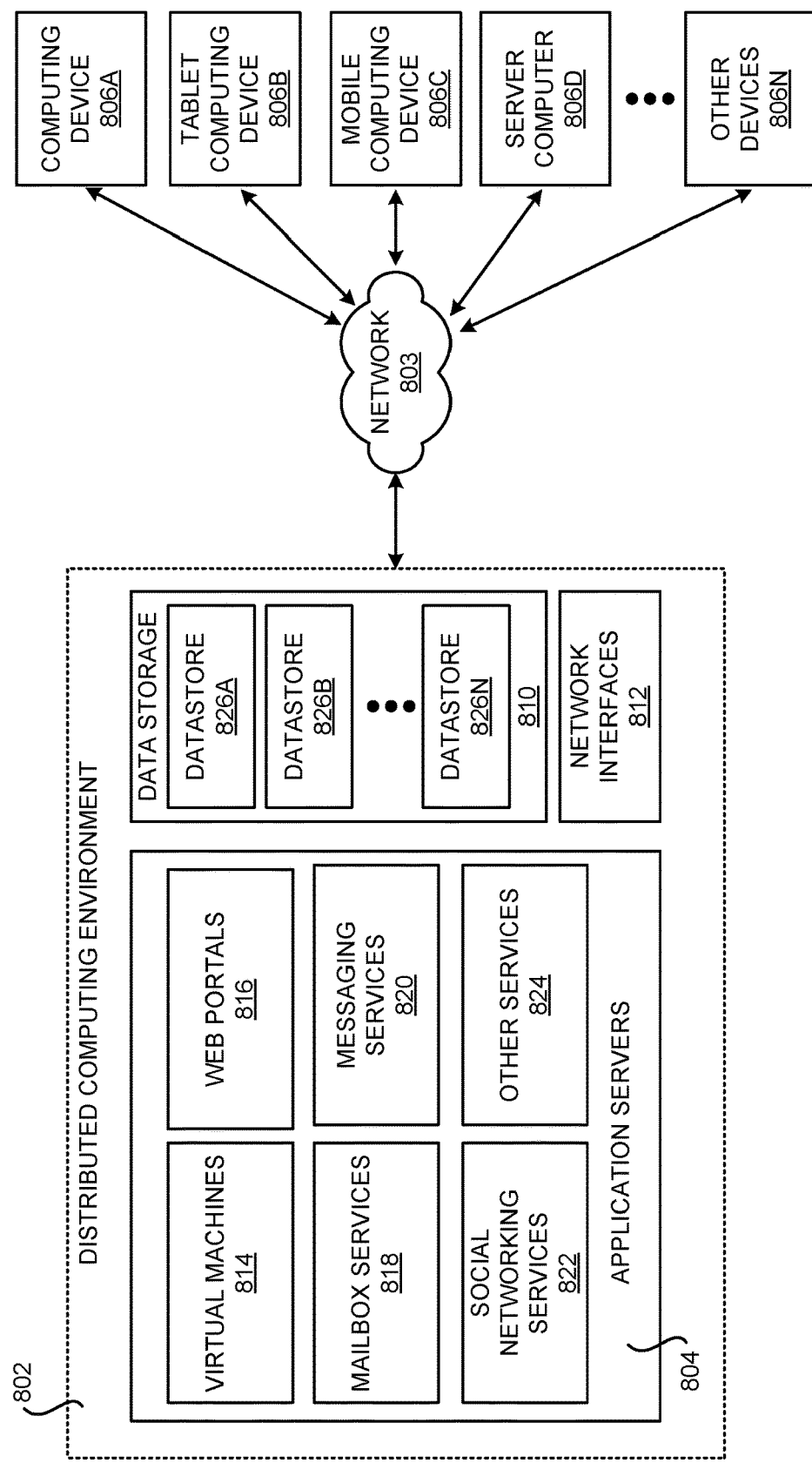
FIG. 8 is a computer system architecture and network diagram illustrating a distributed computing environment capable of implementing aspects of the technologies presented herein.

FIG. 8 shows aspects of an illustrative distributed computing environment 802 in which the software components described herein can be executed. Thus, the distributed computing environment 802 illustrated in FIG. 8 can be used to execute program code, such as the search engine 120 and/or other components operating within the collaboration system 102, capable of providing the functionality described herein with respect to FIGS. 1-6, and/or any of the other software components described herein. For example, and without limitation, the distributed computing environment 802 can be utilized to implement the functionality described herein as being provided by the collaboration system 102.

According to various implementations, the distributed computing environment 802 operates on, in communication with, or as part of a network 803. One or more client devices 806A-806N (hereinafter referred to collectively and/or generically as "clients 806") can communicate with the distributed computing environment 802 via the network 803 and/or other connections (not illustrated in FIG. 8).

In the illustrated configuration, the clients 806 include: a computing device 806A such as a laptop computer, a desktop computer, or other computing device; a "slate" or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the distributed computing environment 802. Two example computing architectures for the clients 806 are illustrated and described herein with reference to FIGS. 7 and 9. The architectures shown in FIGS. 7 and 9 can also be utilized to implement the computing devices 108 described above. In this regard it should be understood that the illustrated clients 806 and computing architectures illustrated and described herein are illustrative, and should not be construed as being limited in any way.

In the illustrated configuration, the distributed computing environment 802 includes application servers 804, data storage 810, and one or more network interfaces 812. According to various implementations, the functionality of the application servers 804 can be provided by one or more server computers that are executing as part of, or in communication with, the network 803. The application servers 804 can host various services such as the search engine 120 described above, virtual machines, portals, and/or other resources. In the illustrated configuration, the application servers 804 host one or more virtual machines 814 for hosting applications or network services, such as components operating within the collaboration system 102, or other types of applications and/or services. It should be understood that this configuration is illustrative, and should not be construed as being limiting in any way. The application servers 804 might also host or provide access to one or more web portals, link pages, web sites, and/or other information ("web portals") 816.

According to various implementations, the application servers 804 also include one or more mailbox services 818 and one or more messaging services 820. The mailbox services 818 can include electronic mail ("email") services. The mailbox services 818 can also include various personal information management ("PIM") services including, but not limited to, calendar services, contact management services, collaboration services, and/or other services. The messaging services 820 can include, but are not limited to, instant messaging ("IM") services, chat services, forum services, and/or other communication services.

The application servers 804 can also include one or more social networking services 822. The social networking services 822 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 822 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 822 are provided by other services, sites, and/or providers that might be referred to as "social networking providers." For example, some web sites allow users to interact with one another via email, chat services, and/or other means during various activities and/or contexts such as reading published articles, commenting on goods or services, publishing, collaboration, gaming, and the like. Other services are possible and are contemplated.

The social networking services 822 can also include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 822 are not mentioned herein for the sake of brevity. As such, the configurations described above are illustrative, and should not be construed as being limited in any way.

As also shown in FIG. 8, the application servers 804 can also host other services, applications, portals, and/or other resources ("other services") 824. The other services 824 can include, but are not limited to, any of the other software components described herein. It thus can be appreciated that the distributed computing environment 802 can provide integration of the technologies disclosed herein with various mailbox, messaging, blogging, social networking, productivity, and/or other types of services or resources.

As mentioned above, the distributed computing environment 802 can include data storage 810. According to various implementations, the functionality of the data storage 810 is provided by one or more databases operating on, or in communication with, the network 803. The functionality of the data storage 810 can also be provided by one or more server computers configured to host data for the distributed computing environment 802. The data storage 810 can include, host, or provide one or more real or virtual datastores 826A-826N (hereinafter referred to collectively and/or generically as "datastores 826"). The datastores 826 are configured to host data used or created by the application servers 804 and/or other data, such as the search index 122, the metadata 114, and the document 104 described above.

The distributed computing environment 802 can communicate with, or be accessed by, the network interfaces 812. The network interfaces 812 can include various types of network hardware and software for supporting communications between two or more computing devices including, but not limited to, the clients 806 and the application servers 804. It should be appreciated that the network interfaces 812 can also be utilized to connect to other types of networks and/or computer systems.

It should be understood that the distributed computing environment 802 described herein can implement any aspects of the software elements described herein with any number of virtual computing resources and/or other distributed computing functionality that can be configured to execute any aspects of the software components disclosed herein. According to various implementations of the technologies disclosed herein, the distributed computing environment 802 provides some or all of the software functionality described herein as a service to the clients 806. It should be understood that the clients 806 can also include real or virtual machines including, but not limited to, server computers, web servers, personal computers, mobile computing devices, smart phones, and/or other devices. As such, various implementations of the technologies disclosed herein enable any device configured to access the distributed computing environment 802 to utilize the functionality described herein.

Figure 9:
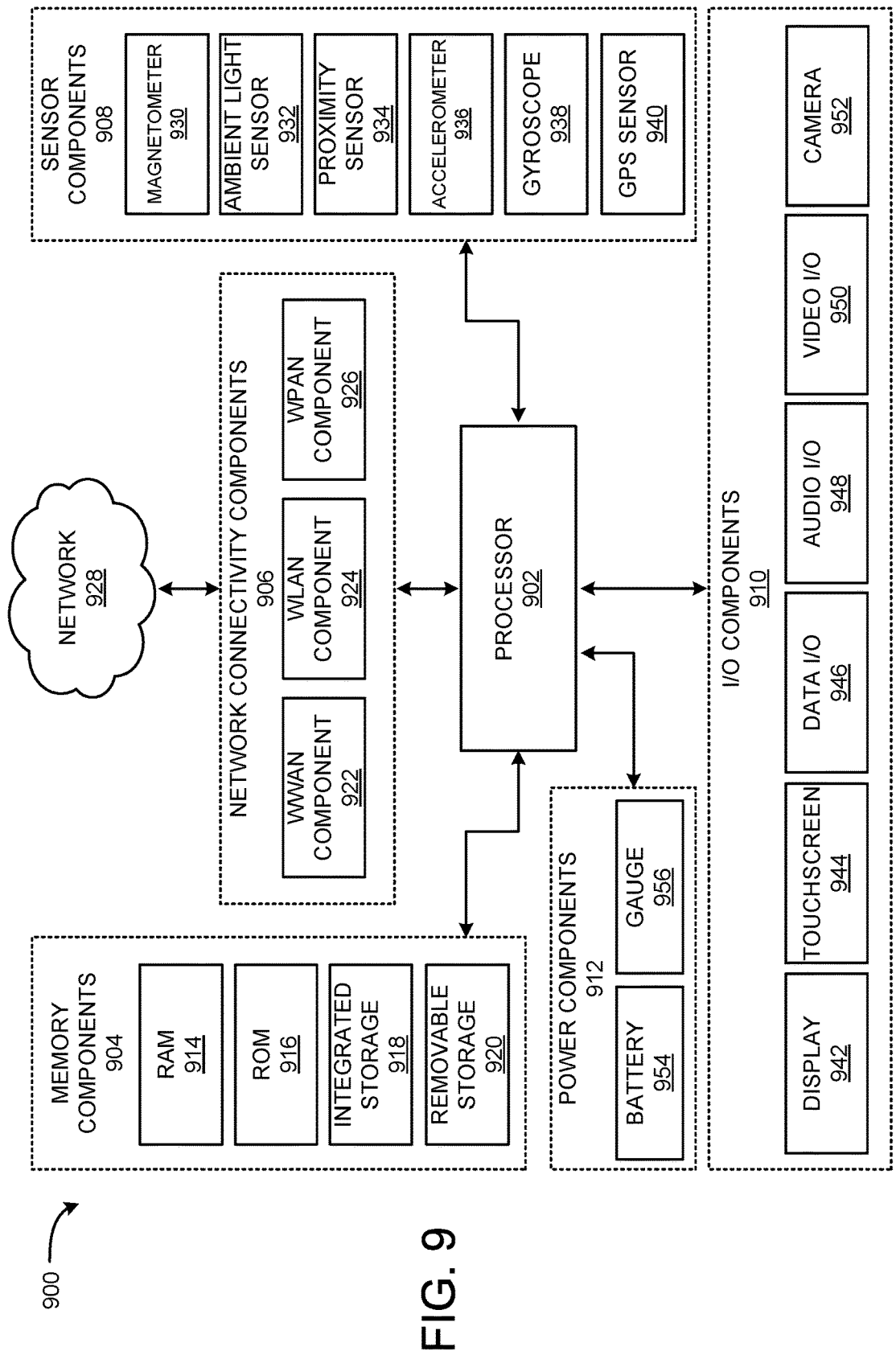
FIG. 9 is a computer architecture diagram illustrating a computing device architecture for another computing device that is capable of implementing aspects of the technologies presented herein.

Turning now to FIG. 9, an illustrative computing device architecture 900 will be described for a computing device that is capable of executing the various software components described herein. The computing device architecture 900 is applicable to computing devices that facilitate mobile computing due, in part, to form factor, wireless connectivity, and/or battery-powered operation. In some configurations, the computing devices include, but are not limited to, smart mobile telephones, tablet devices, slate devices, portable video game devices, and the like.

The computing device architecture 900 is also applicable to any of the clients 806 shown in FIG. 8. Furthermore, aspects of the computing device architecture 900 are applicable to traditional desktop computers, portable computers (e.g., laptops, notebooks, ultra-portables, and netbooks), server computers, and other computer systems, such as those described herein with reference to FIG. 8. For example, the single touch and multi-touch aspects disclosed herein below can be applied to desktop computers that utilize a touchscreen or some other touch-enabled device, such as a touch-enabled track pad or touch-enabled mouse. The computing device architecture 900 can also be utilized to implement the computing devices 108, computing devices within the collaboration system 102, and/or other types of computing devices for implementing or consuming the functionality described herein.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can be connected electrically in order to interact and carry out device functions. In some configurations, the components are arranged so as to communicate via one or more busses (not shown).

The processor 902 includes one or more CPU cores configured to process data, execute computer-executable instructions of one or more application programs, such as the collaborative authoring application 110, and to communicate with other components of the computing device architecture 900 in order to perform aspects of the functionality described herein. The processor 902 can be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, 4K, and greater), video games, 3D modeling applications, and the like. In some configurations, the processor 902 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 902 is, or is included in, a system-on-chip ("SoC") along with one or more of the other components described herein below. For example, the SoC can include the processor 902, a GPU, one or more of the network connectivity components 906, and one or more of the sensor components 908. In some configurations, the processor 902 is fabricated, in part, utilizing a package-on-package ("PoP") integrated circuit packaging technique. Moreover, the processor 902 can be a single core or multi-core processor.

The processor 902 can be created in accordance with an ARM architecture, available for license from ARM HOLDINGS of Cambridge, United Kingdom. Alternatively, the processor 902 can be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a RAM 914, a ROM 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 or the removable storage 920.

The integrated storage 918 can include a solid-state memory, a hard disk, or a combination of solid-state memory and a hard disk. The integrated storage 918 can be soldered or otherwise connected to a logic board upon which the processor 902 and other components described herein might also be connected. As such, the integrated storage 918 is integrated into the computing device. The integrated storage 918 can be configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available and shown to a user as a total combined capacity of the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to, the WINDOWS MOBILE OS, the WINDOWS PHONE OS, or the WINDOWS OS from MICROSOFT CORPORATION, BLACKBERRY OS from RESEARCH IN MOTION, LTD. of Waterloo, Ontario, Canada, IOS from APPLE INC. of Cupertino, Calif., and ANDROID OS from GOOGLE, INC. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from a network 928, which can be a WWAN, a WLAN, or a WPAN. Although a single network 928 is illustrated, the network connectivity components 906 can facilitate simultaneous communication with multiple networks. For example, the network connectivity components 906 can facilitate simultaneous communications with multiple networks via one or more of a WWAN, a WLAN, or a WPAN.

The network 928 can be a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 928 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 928 can be configured to provide voice and/or data communications with any combination of the above technologies. The network 928 can be configured or adapted to provide voice and/or data communications in accordance with future generation technologies.

In some configurations, the WWAN component 922 is configured to provide dual-multi-mode connectivity to the network 928. For example, the WWAN component 922 can be configured to provide connectivity to the network 928, wherein the network 928 provides service via GSM and UMTS technologies, or via some other combination of technologies. Alternatively, multiple WWAN components 922 can be utilized to perform such functionality, and/or provide additional functionality to support other non-compatible technologies (i.e., incapable of being supported by a single WWAN component). The WWAN component 922 can facilitate similar connectivity to multiple networks (e.g., a UMTS network and an LTE network).

The network 928 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 928 via the WI-FI access points. Such connections can be secured via various encryption technologies including, but not limited, WI-FI Protected Access ("WPA"), WPA2, Wired Equivalent Privacy ("WEP"), and the like.

The network 928 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 930, an ambient light sensor 932, a proximity sensor 934, an accelerometer 936, a gyroscope 938, and a Global Positioning System sensor ("GPS sensor") 940. It is contemplated that other sensors, such as, but not limited to, temperature sensors or shock detection sensors, might also be incorporated in the computing device architecture 900.

The magnetometer 930 is configured to measure the strength and direction of a magnetic field. In some configurations the magnetometer 930 provides measurements to a compass application program stored within one of the memory components 904 in order to provide a user with accurate directions in a frame of reference including the cardinal directions, north, south, east, and west. Similar measurements can be provided to a navigation application program that includes a compass component. Other uses of measurements obtained by the magnetometer 930 are contemplated.

The ambient light sensor 932 is configured to measure ambient light. In some configurations, the ambient light sensor 932 provides measurements to an application program stored within one of the memory components 904 in order to automatically adjust the brightness of a display (described below) to compensate for low light and bright light environments. Other uses of measurements obtained by the ambient light sensor 932 are contemplated.

The proximity sensor 934 is configured to detect the presence of an object or thing in proximity to the computing device without direct contact. In some configurations, the proximity sensor 934 detects the presence of a user's body (e.g., the user's face) and provides this information to an application program stored within one of the memory components 904 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 934 are contemplated.

The accelerometer 936 is configured to measure proper acceleration. In some configurations, output from the accelerometer 936 is used by an application program as an input mechanism to control some functionality of the application program. In some configurations, output from the accelerometer 936 is provided to an application program for use in switching between landscape and portrait modes, calculating coordinate acceleration, or detecting a fall. Other uses of the accelerometer 936 are contemplated.

The gyroscope 938 is configured to measure and maintain orientation. In some configurations, output from the gyroscope 938 is used by an application program as an input mechanism to control some functionality of the application program. For example, the gyroscope 938 can be used for accurate recognition of movement within a 3D environment of a video game application or some other application. In some configurations, an application program utilizes output from the gyroscope 938 and the accelerometer 936 to enhance control of some functionality. Other uses of the gyroscope 938 are contemplated.

The GPS sensor 940 is configured to receive signals from GPS satellites for use in calculating a location. The location calculated by the GPS sensor 940 can be used by any application program that requires or benefits from location information. For example, the location calculated by the GPS sensor 940 can be used with a navigation application program to provide directions from the location to a destination or directions from the destination to the location. Moreover, the GPS sensor 940 can be used to provide location information to an external location-based service, such as E911 service. The GPS sensor 940 can obtain location information generated via WI-FI, WIMAX, and/or cellular triangulation techniques utilizing one or more of the network connectivity components 906 to aid the GPS sensor 940 in obtaining a location fix. The GPS sensor 940 can also be used in Assisted GPS ("A-GPS") systems.

The I/O components 910 include a display 942, a touchscreen 944, a data I/O interface component ("data I/O") 946, an audio I/O interface component ("audio I/O") 948, a video I/O interface component ("video I/O") 950, and a camera 952. In some configurations, the display 942 and the touchscreen 944 are combined. In some configurations two or more of the data I/O component 946, the audio I/O component 948, and the video I/O component 950 are combined. The I/O components 910 can include discrete processors configured to support the various interfaces described below, or might include processing functionality built-in to the processor 902.

The display 942 is an output device configured to present information in a visual form. In particular, the display 942 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 942 is a liquid crystal display ("LCD") utilizing any active or passive matrix technology and any backlighting technology (if used). In some configurations, the display 942 is an organic light emitting diode ("OLED") display. Other display types are contemplated.

The touchscreen 944 is an input device configured to detect the presence and location of a touch. The touchscreen 944 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 944 is incorporated on top of the display 942 as a transparent layer to enable a user to use one or more touches to interact with objects or other information presented on the display 942. In other configurations, the touchscreen 944 is a touch pad incorporated on a surface of the computing device that does not include the display 942. For example, the computing device can have a touchscreen incorporated on top of the display 942 and a touch pad on a surface opposite the display 942.

In some configurations, the touchscreen 944 is a single-touch touchscreen. In other configurations, the touchscreen 944 is a multi-touch touchscreen. In some configurations, the touchscreen 944 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 944. As such, a developer can create gestures that are specific to a particular application program.

In some configurations, the touchscreen 944 supports a tap gesture in which a user taps the touchscreen 944 once on an item presented on the display 942. The tap gesture can be used for various reasons including, but not limited to, opening or launching whatever the user taps, such as a graphical icon representing the collaborative authoring application 110. In some configurations, the touchscreen 944 supports a double tap gesture in which a user taps the touchscreen 944 twice on an item presented on the display 942. The double tap gesture can be used for various reasons including, but not limited to, zooming in or zooming out in stages. In some configurations, the touchscreen 944 supports a tap and hold gesture in which a user taps the touchscreen 944 and maintains contact for at least a pre-defined time. The tap and hold gesture can be used for various reasons including, but not limited to, opening a context-specific menu.

In some configurations, the touchscreen 944 supports a pan gesture in which a user places a finger on the touchscreen 944 and maintains contact with the touchscreen 944 while moving the finger on the touchscreen 944. The pan gesture can be used for various reasons including, but not limited to, moving through screens, images, or menus at a controlled rate. Multiple finger pan gestures are also contemplated. In some configurations, the touchscreen 944 supports a flick gesture in which a user swipes a finger in the direction the user wants the screen to move. The flick gesture can be used for various reasons including, but not limited to, scrolling horizontally or vertically through menus or pages. In some configurations, the touchscreen 944 supports a pinch and stretch gesture in which a user makes a pinching motion with two fingers (e.g., thumb and forefinger) on the touchscreen 944 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 944. As such, the above gestures should be understood as being illustrative and should not be construed as being limiting in any way.

The data I/O interface component 946 is configured to facilitate input of data to the computing device and output of data from the computing device. In some configurations, the data I/O interface component 946 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 948 is configured to provide audio input and/or output capabilities to the computing device. In some configurations, the audio I/O interface component 946 includes a microphone configured to collect audio signals. In some configurations, the audio I/O interface component 948 includes a headphone jack configured to provide connectivity for headphones or other external speakers. In some configurations, the audio interface component 948 includes a speaker for the output of audio signals. In some configurations, the audio I/O interface component 948 includes an optical audio cable out.

The video I/O interface component 950 is configured to provide video input and/or output capabilities to the computing device. In some configurations, the video I/O interface component 950 includes a video connector configured to receive video as input from another device (e.g., a video media player such as a DVD or BLU-RAY player) or send video as output to another device (e.g., a monitor, a television, or some other external display). In some configurations, the video I/O interface component 950 includes a High-Definition Multimedia Interface ("HDMI"), mini-HDMI, micro-HDMI, DISPLAYPORT, or proprietary connector to input/output video content. In some configurations, the video I/O interface component 950 or portions thereof is combined with the audio I/O interface component 948 or portions thereof.

The camera 952 can be configured to capture still images and/or video. The camera 952 can utilize a charge coupled device ("CCD") or a complementary metal oxide semiconductor ("CMOS") image sensor to capture images. In some configurations, the camera 952 includes a flash to aid in taking pictures in low-light environments. Settings for the camera 952 can be implemented as hardware or software buttons.

Although not illustrated, one or more hardware buttons can also be included in the computing device architecture 900. The hardware buttons can be used for controlling some operational aspect of the computing device. The hardware buttons can be dedicated buttons or multi-use buttons. The hardware buttons can be mechanical or sensor-based.

The illustrated power components 912 include one or more batteries 954, which can be connected to a battery gauge 956. The batteries 954 can be rechargeable or disposable. Rechargeable battery types include, but are not limited to, lithium polymer, lithium ion, nickel cadmium, and nickel metal hydride. Each of the batteries 954 can be made of one or more cells.

The battery gauge 956 can be configured to measure battery parameters such as current, voltage, and temperature. In some configurations, the battery gauge 956 is configured to measure the effect of a battery's discharge rate, temperature, age and other factors to predict remaining life within a certain percentage of error. In some configurations, the battery gauge 956 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 912 can also include a power connector (not shown), which can be combined with one or more of the aforementioned I/O components 910. The power components 912 can interface with an external power system or charging equipment via a power I/O component. Other configurations can also be utilized.

In view of the above, it is to be appreciated that the disclosure presented herein also encompasses the subject matter set forth in the following clauses:

Clause 1: A computer-implemented method, comprising: receiving edits to a document in real time, the document being collaboratively edited on a plurality of computing devices by a plurality of active editors; indexing the received edits to update a search index in real time; receiving a search query from a computing device, the search query being generated by a user; responsive to receiving the search query, causing a search to be made of the search index; and causing a user interface to be presented at the computing device for presenting results of the search, the user interface comprising an identification of the document, an identification of the plurality of active editors, and a user interface control which, when selected, will cause a request to be transmitted to the plurality of computing devices to admit the user as an additional active editor of the document.

Clause 2: The computer-implemented method of clause 1, wherein the request comprises an identification of the user and an identification of the search query.

Clause 3: The computer-implemented method of clauses 1 and 2, wherein the user interface further comprises a user interface control which, when selected, will cause a request to be transmitted to the plurality of computing devices to admit the user as an additional participant in a real-time messaging session between the plurality of active editors.

Clause 4: The computer-implemented method of clauses 1-3, further comprising: receiving metadata associated with the document in real time; and indexing the received metadata to update the search index in real time.

Clause 5: The computer-implemented method of clauses 1-4, wherein the received metadata identifies the plurality of active editors of the document.

Clause 6: The computer-implemented method of clauses 1-5, wherein the received metadata identifies one or more search terms in the search query.

Clause 7: The computer-implemented method of clauses 1-6, wherein the received metadata identifies previous changes to the document.

Clause 8: The computer-implemented method of clauses 1-7, wherein the received metadata identifies one or more previous active editors of the document.

Clause 9: The computer-implemented method of clauses 1-8, wherein the received metadata includes one or more real-time messaging sessions associated with the document.

Clause 10: An apparatus, comprising: one or more processors; and at least one computer storage medium having computer executable instructions stored thereon which, when executed by the one or more processors, cause the apparatus to receive a search query from a computing device, in response to receiving the search query, cause a search to be made of a search index that has been updated in real time to index edits to a document made by a plurality of active editors of the document, and cause a user interface to be presented at the computing device for presenting results of the search that include the document, the user interface comprising an identification of the document, an identification of the plurality of active editors, and a user interface control which, when selected, will cause a request to be transmitted to a plurality of computing devices associated with the plurality of active editors to admit a user of the computing device as an additional active editor of the document.

Clause 11: The apparatus of clause 10, wherein the request comprises an identification of the user of the computing device and the search query.

Clause 12: The apparatus of clauses 10 and 11, wherein the user interface further comprises a user interface control which, when selected, will cause a request to be transmitted to the plurality of computing devices to admit the user as an additional participant in a real-time messaging session between the plurality of active editors.

Clause 13: The apparatus of clauses 10-12, wherein the search index has been further updated in real time to index metadata associated with the document.

Clause 14: The apparatus of clauses 10-13, wherein the metadata comprises data identifying the plurality of active editors.

Clause 15: The apparatus of clauses 10-14, wherein the metadata further comprises one or more of data identifying one or more search terms in the search query, data identifying previous changes to the document, data identifying one or more previous active editors of the document, and one or more real-time messaging sessions associated with the document.

Clause 16: A computer-readable storage medium having computer executable instructions stored thereon which, when executed by one or more processors, cause the processors to: receive a search query from a computing device; cause a search to be made of a search index that has been updated in real time to index edits to a document made by a plurality of active editors of the document; and cause a user interface to be presented at the computing device for presenting results of the search, the user interface comprising an identification of the document, an identification of the plurality of active editors, and a user interface control which, when selected, will cause a request to be transmitted to a plurality of computing devices associated with the plurality of active editors to admit a user of the computing device as an additional active editor of the document.

Clause 17: The computer-readable storage medium of clause 16, wherein the request comprises an identification of the user of the computing device and the search query.

Clause 18: The computer-readable storage medium of clauses 16 and 17, wherein the user interface further comprises a user interface control which, when selected, will cause a request to be transmitted to the plurality of computing devices to admit the user as an additional participant in a real-time messaging session between the plurality of active editors.

Clause 19: The computer-readable storage medium of clauses 16-18, wherein the search index has been further updated in real time to index metadata associated with the document.

Clause 20: The computer-readable storage medium of clauses 16-19, wherein the metadata further comprises one or more of data identifying the plurality of active editors, data identifying one or more search terms in the search query, data identifying previous changes to the document, data identifying one or more previous active editors of the document, and one or more real-time messaging sessions associated with the document.

Based on the foregoing, it should be appreciated that various technologies for document collaboration discovery have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
receiving edits to content included in a document in real time, the document being collaboratively edited on a plurality of computing devices communicating over a network by a plurality of active editors;
indexing the received edits to update a search index in real time;
receiving a search query from a computing device, the search query being generated by a user;
responsive to receiving the search query, causing a search to be made of the search index;
causing a user interface to be presented at the computing device for presenting results of the search, the user interface comprising
an identification of the document,
an identification of the plurality of active editors, and
a first user interface control which, when selected, will cause a request to be transmitted to the plurality of computing devices to admit the user as an additional active editor of the document; and
in response to selection of the first user interface control, causing a second user interface control to be presented to at least one of the plurality of active editors of the document, wherein selection of the second user interface control by the at least one of the plurality of active editors of the document submits the user as an additional active editor of the document.

2. The computer-implemented method of claim 1, wherein the request comprises an identification of the user and an identification of the search query.

3. The computer-implemented method of claim 1, wherein the user interface further comprises a user interface control which, when selected, will cause a request to be transmitted to the plurality of computing devices to admit the user as an additional participant in a real-time messaging session between the plurality of active editors.

4. The computer-implemented method of claim 1, further comprising:
receiving metadata associated with the document in real time; and
indexing the received metadata to update the search index in real time.

5. The computer-implemented method of claim 4, wherein the received metadata identifies the plurality of active editors of the document.

6. The computer-implemented method of claim 4, wherein the received metadata identifies one or more search terms in the search query.

7. The computer-implemented method of claim 4, wherein the received metadata identifies previous changes to the document.

8. The computer-implemented method of claim 4, wherein the received metadata identifies one or more previous active editors of the document.

9. The computer-implemented method of claim 1, wherein the received metadata includes one or more real-time messaging sessions associated with the document.

10. An apparatus, comprising:
one or more processors; and
at least one computer storage medium having computer executable instructions stored thereon which, when executed by the one or more processors, cause the apparatus to
receive a search query from a computing device,
in response to receiving the search query, cause a search to be made of a search index that has been updated in real time to index edits to content included in a document made by a plurality of active editors of the document,
cause a user interface to be presented at the computing device for presenting results of the search that include the document, the user interface comprising
an identification of the document,
an identification of the plurality of active editors, and
a first user interface control which, when selected, will cause a request to be transmitted to a plurality of computing devices communicating over a network and associated with the plurality of active editors to admit a user of the computing device as an additional active editor of the document; and
in response to selection of the first user interface control, cause a second user interface control to be presented to at least one of the plurality of active editors of the document, wherein selection of the second user interface control by the at least one of the plurality of active editors of the document submits the user as an additional active editor of the document.

11. The apparatus of claim 10, wherein the request comprises an identification of the user of the computing device and the search query.

12. The apparatus of claim 10, wherein the user interface further comprises a user interface control which, when selected, will cause a request to be transmitted to the plurality of computing devices to admit the user as an additional participant in a real-time messaging session between the plurality of active editors.

13. The apparatus of claim 10, wherein the search index has been further updated in real time to index metadata associated with the document.

14. The apparatus of claim 13, wherein the metadata comprises data identifying the plurality of active editors.

15. The apparatus of claim 14, wherein the metadata further comprises one or more of data identifying one or more search terms in the search query, data identifying previous changes to the document, data identifying one or more previous active editors of the document, and one or more real-time messaging sessions associated with the document.

16. A computer-readable storage medium having computer executable instructions stored thereon which, when executed by one or more processors, cause the processors to:
receive a search query from a computing device;
cause a search to be made of a search index that has been updated in real time to index edits to content included in a document made by a plurality of active editors of the document;
cause a user interface to be presented at the computing device for presenting results of the search, the user interface comprising
an identification of the document,
an identification of the plurality of active editors, and
a first user interface control which, when selected, will cause a request to be transmitted to a plurality of computing devices communicating over a network and associated with the plurality of active editors to admit a user of the computing device as an additional active editor of the document; and
in response to selection of the first user interface control, cause a second user interface control to be presented to at least one of the plurality of active editors of the document, wherein selection of the second user interface control by the at least one of the plurality of active editors of the document submits the user as an additional active editor of the document.

17. The computer-readable storage medium of claim 16, wherein the request comprises an identification of the user of the computing device and the search query.

18. The computer-readable storage medium of claim 17, wherein the user interface further comprises a user interface control which, when selected, will cause a request to be transmitted to the plurality of computing devices to admit the user as an additional participant in a real-time messaging session between the plurality of active editors.

19. The computer-readable storage medium of claim 16, wherein the search index has been further updated in real time to index metadata associated with the document.

20. The computer-readable storage medium of claim 19, wherein the metadata further comprises one or more of data identifying the plurality of active editors, data identifying one or more search terms in the search query, data identifying previous changes to the document, data identifying one or more previous active editors of the document, and one or more real-time messaging sessions associated with the document.

\* \* \* \* \*